US012674911B2

(12) United States Patent
Tsai et al.

(10) Patent No.: US 12,674,911 B2
(45) Date of Patent: Jul. 7, 2026

(54) OPTICAL LENS ASSEMBLY, IMAGING APPARATUS AND ELECTRONIC DEVICE

(71) Applicant: LARGAN PRECISION CO., LTD., Taichung City (TW)

(72) Inventors: Wen-Yu Tsai, Taichung City (TW); Hsiang-Chi Tang, Taichung City (TW); Yu Jie Hong, Taichung City (TW); Chun-Hung Teng, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 816 days.

(21) Appl. No.: 18/054,935

(22) Filed: Nov. 14, 2022

(65) Prior Publication Data

US 2023/0251400 A1      Aug. 10, 2023

(30) Foreign Application Priority Data

Dec. 29, 2021     (TW) ................................. 110149457

(51) Int. Cl.
| | |
|---|---|
| *G02B 1/04* | (2006.01) |
| *G02B 1/115* | (2015.01) |
| *G02B 3/04* | (2006.01) |
| *G02B 5/20* | (2006.01) |
| *G02B 13/00* | (2006.01) |

(52) U.S. Cl.
CPC .............. *G02B 1/041* (2013.01); *G02B 1/115* (2013.01); *G02B 3/04* (2013.01); *G02B 5/208* (2013.01); *G02B 13/008* (2013.01)

(58) Field of Classification Search
CPC .......... G02B 1/041; G02B 1/115; G02B 3/04; G02B 5/208; G02B 13/008; G02B 5/285; G02B 1/10; G02B 5/281; G02B 13/14; G02B 1/04
See application file for complete search history.

(56) References Cited

U.S. PATENT DOCUMENTS

| | | | |
|---|---|---|---|
| 10,732,390 B2 | 8/2020 | Bone | |
| 10,795,066 B2 | 10/2020 | Shimmo | |
| 2006/0056061 A1 | 3/2006 | Chen | |
| 2006/0291061 A1 | 12/2006 | Iyama | |
| 2008/0100910 A1 | 5/2008 | Kim et al. | |
| 2016/0195651 A1 | 7/2016 | Yoshioka | |
| 2017/0343710 A1* | 11/2017 | Shiono .................... G02B 5/208 |
| 2018/0017721 A1* | 1/2018 | Nagaya ..................... G01J 1/02 |
| 2018/0067242 A1 | 3/2018 | Lai | |

(Continued)

FOREIGN PATENT DOCUMENTS

| | | |
|---|---|---|
| CN | 205844558 U | 12/2016 |
| CN | 106454049 A | 2/2017 |
| CN | 106908888 A | 6/2017 |

(Continued)

*Primary Examiner* — Balram T Parbadia

(74) *Attorney, Agent, or Firm* — McClure, Qualey & Rodack, LLP

(57) ABSTRACT

An optical lens assembly includes at least one optical element. At least one of the at least one optical element includes a multi-layer coating membrane, and the multi-layer coating membrane is formed by alternately stacking high refractive index layers and low refractive index layers. The multi-layer coating membrane is a dual-bandpass filtering membrane.

17 Claims, 6 Drawing Sheets

(56)　　　　　　References Cited

U.S. PATENT DOCUMENTS

2020/0310017　A1　　10/2020　Yu
2021/0302635　A1　　 9/2021　Ockenfuss

FOREIGN PATENT DOCUMENTS

| CN | 206559462 | U | 10/2017 |
|----|-----------|---|---------|
| CN | 107315212 | A | 11/2017 |
| CN | 206638843 | U | 11/2017 |
| CN | 207114812 | U | 3/2018 |
| CN | 105891928 | B | 6/2018 |
| CN | 105589123 | B | 9/2018 |
| CN | 208388620 | U | 1/2019 |
| CN | 110824601 | A | 2/2020 |
| CN | 111552017 | A | 8/2020 |
| CN | 111596394 | A | 8/2020 |
| CN | 211180279 | U | 8/2020 |
| CN | 212965496 | U | 4/2021 |
| CN | 213182100 | U | 5/2021 |
| CN | 112899622 | A | 6/2021 |
| CN | 113433607 | A | 9/2021 |
| IN | 106950633 | A | 7/2017 |
| KR | 20070103553 | A | 10/2007 |
| TW | M562404 | U | 6/2018 |

* cited by examiner

OPTICAL LENS ASSEMBLY, IMAGING APPARATUS AND ELECTRONIC DEVICE

RELATED APPLICATIONS

This application claims priority to Taiwan Application Serial Number 110149457, filed Dec. 29, 2021, which is herein incorporated by reference.

BACKGROUND

Technical Field

The present disclosure relates to an optical lens assembly, an imaging apparatus and an electronic device. More particularly, the present disclosure relates to an optical lens assembly, an imaging apparatus and an electronic device including an optical element with a multi-layer coating membrane.

Description of Related Art

With the advancement of technology, users become more and more dependent on electronic devices, and the quality demands for the electronic devices are also increasing day by day. Accordingly, optical lens assembly for imaging or infrared light sensing also needs to be refined according to the needs of the users.

In order to satisfy the requirements of imaging and infrared light sensing, a multiple lens assemblies design of imaging and near-infrared light is needed to equip in the conventional electronic device so as to avoid the mutual interference there between. Although there is a design solution by arranging a dual-bandpass filtering glass plate in a single lens assembly, both of the multiple lens assemblies design and the dual-bandpass filtering glass plate cannot avoid the generation of chromatic aberration. Further, the number of elements used is increased and resulting in the increase of the cost, and there is a greater risk of shattering of the glass plate. Furthermore, the angle of view of the lens assembly of the conventional electronic device is smaller, and the differences of the transmittance of the light with different wavelengths at different angles are not obvious. However, along with the changes of the photographing demands of the user, the shooting angle is gradually increased. In optical imaging, because of the different angles of the light entering the lens assembly, there have different transmittances in the wavelengths at each of the angles, resulting in the decrease of the accuracy of infrared light sensing and causing the chromatic aberration in optical imaging. Moreover, the size of the optical elements disposed in the conventional electronic device is larger. Along with the increasing of the demands of the optical lens assembly of user and corresponding to the requirements of optical imaging thereof, the number of the lens elements in the optical lens assembly is increased, the overall size thereof is compressed, and other optical elements are needed to arrange in the optical lens assembly additionally so as to achieve variable functions thereof. For example, when the near-infrared light filtering effect of the optical lens assembly is wanted, the plate element with coating is needed to arrange in the optical lens assembly. However, the plate element will occupy a certain space, so that the miniaturization of the optical lens assembly will be hindered.

Accordingly, in order to satisfy the different requirements of users for the optical lens assembly, it is necessary to develop corresponding technologies or propose technologies that can solve multiple problems at the same time.

SUMMARY

According to one aspect of the present disclosure, an optical lens assembly includes at least one optical element. At least one of the at least one optical element includes a multi-layer coating membrane, and the multi-layer coating membrane is formed by alternately stacking high refractive index layers and low refractive index layers. The multi-layer coating membrane is a dual-bandpass filtering membrane. When a wavelength difference between an incidence at 0 degrees and an incidence at 30 degrees of the optical element including the multi-layer coating membrane at 50% transmittance of long-wavelength visible light is dWt50v, an average transmittance in a wavelength range of 450 nm-630 nm of the optical element including the multi-layer coating membrane is T4563, and an average transmittance in a wavelength range of 700 nm-760 nm of the optical element including the multi-layer coating membrane is T7076, the following conditions are satisfied: $|dWt50v| \leq 20$ nm; $70\% \leq T4563$; and $T7076 \leq 3\%$.

According to another aspect of the present disclosure, an imaging apparatus includes the optical lens assembly according to the aforementioned aspect and an image sensor disposed on an image surface of the optical lens assembly.

According to further another aspect of the present disclosure, an electronic device includes the imaging apparatus according to the aforementioned aspect.

According to yet another aspect of the present disclosure, an optical lens assembly includes at least one optical element, wherein at least one of the at least one optical element is an optical lens element, and the optical lens element is made of a plastic material and has aspherical surfaces. The optical lens element includes a multi-layer coating membrane, and the multi-layer coating membrane is formed by alternately stacking high refractive index layers and low refractive index layers. The multi-layer coating membrane is a dual-bandpass filtering membrane. When an average transmittance in a wavelength range of 350 nm-400 nm of the optical element including the multi-layer coating membrane is T3540, an average transmittance in a wavelength range of 450 nm-630 nm of the optical element including the multi-layer coating membrane is T4563, an average transmittance in a wavelength range of 700 nm-760 nm of the optical element including the multi-layer coating membrane is T7076, and a total number of layers of the multi-layer coating membrane is tLs, the following conditions are satisfied: $T3540 \leq 10\%$; $70\% \leq T4563$; $T7076 \leq 3\%$; and $65 \leq tLs \leq 200$.

According to still another aspect of the present disclosure, an imaging apparatus includes the optical lens assembly according to the aforementioned aspect and an image sensor disposed on an image surface of the optical lens assembly.

According to further still aspect of the present disclosure, an electronic device includes the imaging apparatus according to the aforementioned aspect.

According to further yet aspect of the present disclosure, an optical lens assembly includes at least one optical element, wherein at least one of the at least one optical element is an optical lens element, and the optical lens element is made of a plastic material and has aspherical surfaces. The optical lens element includes a multi-layer coating membrane, and the multi-layer coating membrane is formed by alternately stacking high refractive index layers and low refractive index layers. When a wavelength difference between an incidence at 0 degrees and an incidence at 30 degrees of the optical element including the multi-layer coating membrane at 50% transmittance of long-wavelength visible light is dWt50v, an average transmittance in a wavelength range of 450 nm-630 nm of the optical element including the multi-layer coating membrane is T4563, and an average transmittance in a wavelength range of 700 nm-1050 nm of the optical element including the multi-layer coating membrane is T70105, the following conditions are satisfied: $|dWt50v| \leq 20$ nm; $70\% \leq T4563$; and $T70105 \leq 10\%$.

According to more still aspect of the present disclosure, an imaging apparatus includes the optical lens assembly according to the aforementioned aspect and an image sensor disposed on an image surface of the optical lens assembly.

According to more yet aspect of the present disclosure, an electronic device includes the imaging apparatus according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
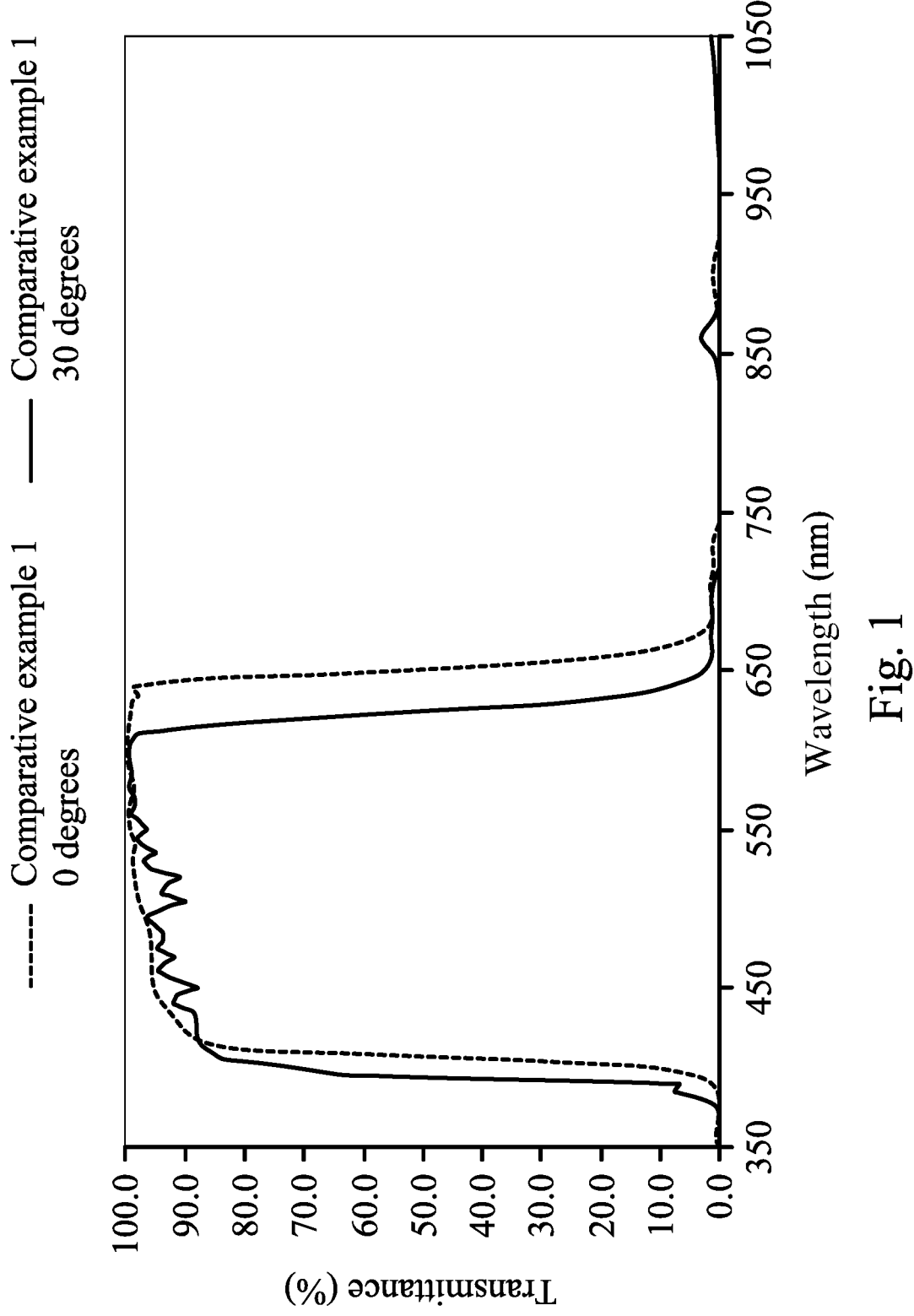
FIG. 1 is a relationship diagram between transmittances and wavelengths of an optical element including a multi-layer coating membrane according to Comparative example 1.

The present disclosure provides an optical lens assembly including at least one optical element. At least one of the at least one optical element includes a multi-layer coating membrane, and the multi-layer coating membrane is formed by alternately stacking high refractive index layers and low refractive index layers. The multi-layer coating membrane is a dual-bandpass filtering membrane. Therefore, based on the arrangement that the technology of multi-layer coating membrane is applied to the optical element, the optical lens assembly of the present disclosure can be penetrated by the visible light as well as the infrared lights with specific wavelengths, and filter out lights with other wavelengths by the technology of the dual-bandpass coating. Thus, the optical lens assembly of the present disclosure has both imaging and near-infrared light sensing functions. Furthermore, by the arrangement of the multi-layer coating membrane, it is favorable for reducing the difference in the transmittance of the long-wavelength visible light at different angles so as to reduce the chromatic aberration caused by the difference in transmittance.

The present disclosure further provides an optical lens assembly including at least one optical element, wherein at least one of the at least one optical element is an optical lens element, and the optical lens element is made of a plastic material and has aspherical surfaces. The optical lens element includes a multi-layer coating membrane, and the multi-layer coating membrane is formed by alternately stacking high refractive index layers and low refractive index layers. The multi-layer coating membrane is a dual-bandpass filtering membrane. Therefore, based on the arrangement that the technology of multi-layer coating membrane is applied to the optical lens element, the optical lens assembly of the present disclosure can reduce the number of the traditional filter elements and further reduce the size of the optical lens assembly by that the aspherical surface of the optical lens element is designed with multi-layer coating membrane filtering technology. Furthermore, by the arrangement that the dual-bandpass filtering membrane is disposed on the aspherical surfaces of the optical lens element, the optical lens assembly of the present disclosure can be penetrated by the visible light as well as the infrared lights with specific wavelengths, and filter out lights with other wavelengths based on the coating technology of the dual-bandpass filtering membrane, so that the optical lens assembly of the present disclosure has both imaging and near-infrared light sensing functions.

The present disclosure further provides an optical lens assembly includes at least one optical element, wherein at least one of the at least one optical element is an optical lens element, and the optical lens element is made of a plastic material and has aspherical surfaces. The optical element includes a multi-layer coating membrane, and the multi-layer coating membrane is formed by alternately stacking high refractive index layers and low refractive index layers. Therefore, based on the arrangement that the technology of multi-layer coating membrane is applied to the optical lens element, the optical lens assembly of the present disclosure can reduce the difference in the transmittance of the long-wavelength visible light at different angles so as to reduce the chromatic aberration caused by the difference in transmittance by that the aspherical surface of the optical lens element is designed with multi-layer coating membrane filtering technology. Furthermore, by the arrangement that the aspheric surface of the optical lens element is designed with multi-layer coating membrane technology, it is favorable for filtering out the near-infrared light effectively so as to prevent the imaging from affecting by the near-infrared light.

According to the optical lens assembly of the present disclosure, when an average transmittance in a wavelength range of 450 nm-630 nm of the optical element including the multi-layer coating membrane is T4563, the following condition is satisfied: $70\% \leq T4563$. Therefore, the multi-layer coating membrane can have an excellent effect on the penetration of the visible light. Furthermore, the following condition can be satisfied: $80\% \leq T4563$. Furthermore, the following condition can be satisfied: $85\% \leq T4563$. Furthermore, the following condition can be satisfied: $90\% \leq T4563$. Furthermore, the following condition can be satisfied: $95\% \leq T4563 \leq 100\%$.

According to the optical lens assembly of the present disclosure, when an average transmittance in a wavelength range of 700 nm-760 nm of the optical element including the multi-layer coating membrane is T7076, the following condition is satisfied: T7076≤3%. Therefore, the multi-layer coating membrane can have an excellent near-infrared light filtering function. Furthermore, the following condition can be satisfied: T7076≤2%. Furthermore, the following condition can be satisfied: T7076≤1%. Furthermore, the following condition can be satisfied: 0%≤T7076<0.5%.

According to the optical lens assembly of the present disclosure, when a wavelength difference between an incidence at 0 degrees and an incidence at 30 degrees of the optical element including the multi-layer coating membrane at 50% transmittance of long-wavelength visible light is dWt50v, the following condition is satisfied: |dWt50v|≤20 nm. Therefore, the transmittance difference between each of the angles can be reduced by the multi-layer coating membrane. Furthermore, the following condition can be satisfied: |dWt50v|≤18 nm. Furthermore, the following condition can be satisfied: |dWt50v|≤15 nm. Furthermore, the following condition can be satisfied: |dWt50v|≤13 nm. Furthermore, the following condition can be satisfied: 0 nm≤|dWt50v|≤12 nm.

According to the optical lens assembly of the present disclosure, when an average transmittance in a wavelength range of 350 nm-400 nm of the optical element including the multi-layer coating membrane is T3540, the following condition is satisfied: T3540≤10%. Therefore, the multi-layer coating membrane can have an excellent UV light filtering function. Furthermore, the following condition can be satisfied: T3540≤5%. Furthermore, the following condition can be satisfied: T3540≤2.5%. Furthermore, the following condition can be satisfied: T3540≤1%. Furthermore, the following condition can be satisfied: 0%<T3540≤0.1%.

According to the optical lens assembly of the present disclosure, when a total number of layers of the multi-layer coating membrane is tLs, the following condition is satisfied: 65≤tLs≤200. Therefore, by controlling the total number of layers of the multi-layer coating membrane, it is favorable for enhancing the penetrating effect of the visible light and the infrared lights with specific wavelengths, and the excessive deformation of the optical lens element caused by the too many coating layers can be avoided. Furthermore, the following condition can be satisfied: 70≤tLs≤180. Furthermore, the following condition can be satisfied: 75≤tLs≤170. Furthermore, the following condition can be satisfied: 75≤tLs≤160. Furthermore, the following condition can be satisfied: 80≤tLs≤150. Therefore, it is favorable for enhancing the penetrating effect of the near-infrared light with specific wavelengths.

According to the optical lens assembly of the present disclosure, when an average transmittance in a wavelength range of 700 nm-1050 nm of the optical element including the multi-layer coating membrane is T70105, the following condition is satisfied: T70105≤10%. Therefore, the multi-layer coating membrane can have an excellent near-infrared light filtering function. Furthermore, the following condition can be satisfied: T70105≤5%. Furthermore, the following condition can be satisfied: T70105≤1%. Furthermore, the following condition can be satisfied: T70105≤0.5%. Furthermore, the following condition can be satisfied: 0%≤T70105≤0.2%.

According to the optical lens assembly of the present disclosure, when a proportion of a total transmittance difference between the incidence at 0 degrees and the incidence at 30 degrees of the optical element including the multi-layer coating membrane in a wavelength range of 600 nm-700 nm of long-wavelength visible light is RdTv, the following condition can be satisfied: RdTv≤0.45. Therefore, by the arrangement of the multi-layer coating membrane of the optical element, the proportion of the total transmittance difference between two angles of the long-wavelength visible light can be controlled, and the effect of chromatic aberration correction can be enhanced. Furthermore, the following condition can be satisfied: RdTv≤0.42. Furthermore, the following condition can be satisfied: RdTv≤0.40. Furthermore, the following condition can be satisfied: RdTv≤0.38. Furthermore, the following condition can be satisfied: RdTv≤0.35. Furthermore, the following condition can be satisfied: 0≤RdTv≤0.30.

According to the optical lens assembly of the present disclosure, when an average wavelength of the incidence at 0 degrees and the incidence at 30 degrees of the optical element including the multi-layer coating membrane at 50% transmittance of long-wavelength visible light is Wt50avg, the following condition can be satisfied: 640 nm≤Wt50avg≤670 nm. Therefore, by controlling the average wavelength at 50% transmittance of different angles, the transmission wavelengths of the incident light can be restricted so as to reduce the interference of the near-infrared light. Furthermore, by controlling the average wavelength at 50% transmittance of different angles, it is favorable for reducing the transmittance difference between target wavelengths. Furthermore, the following condition can be satisfied: 640 nm≤Wt50avg≤665 nm. Furthermore, the following condition can be satisfied: 640 nm≤Wt50avg≤660 nm. Furthermore, the following condition can be satisfied: 640 nm≤Wt50avg≤655 nm. Furthermore, the following condition can be satisfied: 645 nm≤Wt50avg≤650 nm.

According to the optical lens assembly of the present disclosure, when a wavelength difference between an incidence at 0 degrees and an incidence at 30 degrees of the optical element including the multi-layer coating membrane at 50% transmittance of long-wavelength near-infrared light is dWt50i, the following condition can be satisfied: |dWt50i|≤30 nm. Therefore, by controlling the transmittance difference between two angles of the long-wavelength near-infrared light, it is favorable for improving the accuracy of near-infrared sensing. Furthermore, the following condition can be satisfied: |dWt50i|≤25 nm. Furthermore, the following condition can be satisfied: |dWt50i|≤20 nm. Furthermore, the following condition can be satisfied: |dWt50i|≤18 nm. Furthermore, the following condition can be satisfied: 0≤|dWt50i|≤14 nm.

According to the optical lens assembly of the present disclosure, when a proportion of a total transmittance difference between the incidence at 0 degrees and the incidence at 30 degrees of the optical element including the multi-layer coating membrane in a wavelength range of 850 nm-1000 nm of long-wavelength near-infrared light is RdTi, the following condition can be satisfied: RdTi≤0.45. Therefore, by controlling the proportion of the total transmittance difference between two angles of the long-wavelength visible light, it is favorable for reducing the transmittance difference of the long-wavelength near-infrared light so as to reduce the infrared light sensing errors. Furthermore, the following condition can be satisfied: RdTi≤0.40. Furthermore, the following condition can be satisfied: RdTi≤0.35. Furthermore, the following condition can be satisfied: RdTi≤0.30. Furthermore, the following condition can be satisfied: 0≤RdTi≤0.25.

According to the optical lens assembly of the present disclosure, the multi-layer coating membrane includes at least one of the low refractive index layers, and the multi-layer coating membrane includes at least one of the high refractive index layers, wherein when a total thickness of the low refractive index layer is LtTk, and a total thickness of the high refractive index layer is HtTk, the following condition can be satisfied: $1.0 \leq LtTk/HtTk \leq 1.5$. Therefore, by controlling the ratio of the thickness of the low refractive index layer and the thickness of the high refractive index layer, it is favorable for reducing the transmittance difference of the wavelength at 50% transmittance between each of the angles of the visible light. Furthermore, the following condition can be satisfied: $1.05 \leq LtTk/HtTk \leq 1.5$. Furthermore, the following condition can be satisfied: $1.1 \leq LtTk/HtTk \leq 1.5$. Furthermore, the following condition can be satisfied: $1.15 \leq LtTk/HtTk \leq 1.5$. Furthermore, the following condition can be satisfied: $1.2 \leq LtTk/HtTk \leq 1.5$.

According to the optical lens assembly of the present disclosure, the optical element including the multi-layer coating membrane can be an optical lens element, and the optical lens element is made of a plastic material and has aspherical surfaces. Therefore, the multi-layer coating membrane is coated on the optical lens element made of a plastic material and having aspherical surface, so that the peripheral aberrations can be corrected, and the manufacturing costs can be reduced.

According to the optical lens assembly of the present disclosure, when each of an object-side surface and an image-side surface of the at least one optical element includes the multi-layer coating membrane, a total thickness of the multi-layer coating membrane on the object-side surface of the optical element is otTk, and a total thickness of the multi-layer coating membrane on the image-side surface of the optical element is itTk, the following condition can be satisfied: $0.1 \leq otTk/itTk \leq 10$. Therefore, by arranging the multi-layer coating membrane on the object-side surface and the image-side surface of the optical element or the plastic optical lens element, it is favorable for reducing the deformation caused by high temperature during coating of the optical element or the optical lens element or other reasons. Furthermore, the following condition can be satisfied: $0.2 \leq otTk/itTk \leq 5$. Furthermore, the following condition can be satisfied: $0.3 \leq otTk/itTk \leq 3.5$. Furthermore, the following condition can be satisfied: $0.4 \leq otTk/itTk \leq 2.5$. Furthermore, the following condition can be satisfied: $0.5 \leq otTk/itTk \leq 2$.

According to the optical lens assembly of the present disclosure, the multi-layer coating membrane includes at least one of the low refractive index layers, and the multi-layer coating membrane includes at least one of the high refractive index layers, wherein when a refractive index of the high refractive index layer is NH, and a refractive index of the low refractive index layer is NL, the following conditions can be satisfied: $1.9 \leq NH$; and $NL < 1.9$. Therefore, by controlling the refractive index of the high refractive index layer and the refractive index of the low refractive index layer, a larger difference of the transmittance can be provided, so that it is favorable for enhancing the penetrating effect of the visible light as well as the near-infrared light with specific wavelengths. Furthermore, the following conditions can be satisfied: $2.0 \leq NH$; and $NL < 1.8$. Furthermore, the following conditions can be satisfied: $2.1 \leq NH$; and $NL < 1.7$. Furthermore, the following conditions can be satisfied: $2.2 \leq NH$; and $NL < 1.6$. Furthermore, the following conditions can be satisfied: $2.3 \leq NH$; and $NL < 1.5$.

According to the optical lens assembly of the present disclosure, when a transmittance at a wavelength of 850 nm of the optical element including the multi-layer coating membrane is T85, the following condition can be satisfied: $70\% \leq T85$. Therefore, by controlling the transmittance of the near-infrared light at the wavelength of 850 nm, it is favorable for improving the identification specificity of the wavelength used for near-infrared light sensing. Furthermore, by controlling the transmittance of the near-infrared light with specific wavelengths, the dual-bandpass filtering function of the multi-layer coating membrane can be ensured. Furthermore, the following condition can be satisfied: $80\% \leq T85$. Furthermore, the following condition can be satisfied: $85\% \leq T85$. Furthermore, the following condition can be satisfied: $90\% \leq T85$. Furthermore, the following condition can be satisfied: $95\% \leq T85 \leq 100\%$.

According to the optical lens assembly of the present disclosure, when an average transmittance in a wavelength range of 830 nm-870 nm of the optical element including the multi-layer coating membrane is T8387, the following condition can be satisfied: $70\% \leq T8387$. Therefore, by controlling the transmittance of the near-infrared light ranging from 830 nm to 870 nm, it is favorable for improving the recognition accuracy of the near-infrared light sensing system. Furthermore, the following condition can be satisfied: $80\% \leq T8387$. Furthermore, the following condition can be satisfied: $85\% \leq T8387$. Furthermore, the following condition can be satisfied: $90\% \leq T8387 \leq 99\%$. Furthermore, the following condition can be satisfied: $99\% \leq T8387 \leq 100\%$.

According to the optical lens assembly of the present disclosure, the optical element can be an optical lens element, wherein when a slope from a center position to a position of a maximum effective diameter of the optical lens element is SPsd, the following condition can be satisfied: $7.5 \leq |SPsd|$. Therefore, by controlling the change of the surface shape of the optical lens element, a sufficient coating uniformity in the effective diameter region of the optical lens element can be maintained, so that it is favorable for improving the consistent effect of the overall filtering of the multi-layer coating membrane. Furthermore, the following condition can be satisfied: $7.6 \leq |SPsd|$. Furthermore, the following condition can be satisfied: $7.7 \leq |SPsd|$. Furthermore, the following condition can be satisfied: $7.8 \leq |SPsd|$. Furthermore, the following condition can be satisfied: $7.9 \leq |SPsd|$. Furthermore, the following condition can be satisfied: $8.0 \leq |SPsd| \leq$ infinite.

According to the optical lens assembly of the present disclosure, the optical element can be an optical lens element, wherein when a slope from the center position to a position of a maximum horizontal displacement of the optical lens element is SPmax, the following condition can be satisfied: $7.5 \leq |SPmax|$. Therefore, by controlling the change of the surface shape of the optical lens element, a sufficient coating uniformity in the central region of the optical lens element can be maintained, so that it is favorable for improving the consistent effect of the partial filtering of the multi-layer coating membrane. Furthermore, the following condition can be satisfied: $7.6 \leq |SPmax|$. Furthermore, the following condition can be satisfied: $7.7 \leq |SPmax|$. Furthermore, the following condition can be satisfied: $7.8 \leq |SPmax|$. Furthermore, the following condition can be satisfied: $7.9 \leq |SPmax|$. Furthermore, the following condition can be satisfied: $8.0 \leq |SPmax| \leq$ infinite.

According to the optical lens assembly of the present disclosure, the optical element can be an optical lens element, wherein when the position of the maximum effective diameter and the position of the maximum horizontal displacement of the optical lens element are different, and a slope from the position of the maximum horizontal displacement to the position of the maximum effective diameter of the optical lens element is SPbi, the following condition can be satisfied: $7.5 \leq |SPbi|$. Therefore, by controlling the change of the surface shape of the optical lens element, a sufficient coating uniformity in the peripheral region of the optical lens element can be maintained, so that it is favorable for improving the consistent effect of the partial filtering of the multi-layer coating membrane. Furthermore, the following condition can be satisfied: 7.6≤|SPbi|. Furthermore, the following condition can be satisfied: 7.7≤|SPbi|. Furthermore, the following condition can be satisfied: 7.8≤|SPbi|. Furthermore, the following condition can be satisfied: 7.9≤|SPbi|. Furthermore, the following condition can be satisfied: 8.0≤|SPbi|≤infinite.

According to the optical lens assembly of the present disclosure, when an average transmittance in a wavelength range of 400 nm-500 nm of the optical element including the multi-layer coating membrane is T4050, the following condition can be satisfied: 50%≤T4050. Therefore, the multi-layer coating membrane can have an excellent effect on the penetration of the visible light. Furthermore, the following condition can be satisfied: 60%≤T4050. Furthermore, the following condition can be satisfied: 70%≤T4050. Furthermore, the following condition can be satisfied: 70%≤T4050≤80%. Furthermore, the following condition can be satisfied: 80%≤T4050≤100%.

According to the optical lens assembly of the present disclosure, when an average transmittance in a wavelength range of 500 nm-600 nm of the optical element including the multi-layer coating membrane is T5060, the following condition can be satisfied: 70%≤T5060. Therefore, the multi-layer coating membrane can have an excellent effect on the penetration of the visible light. Furthermore, the following condition can be satisfied: 80%≤T5060. Furthermore, the following condition can be satisfied: 85%≤T5060. Furthermore, the following condition can be satisfied: 90%≤T5060. Furthermore, the following condition can be satisfied: 95%≤T5060≤100%.

According to the optical lens assembly of the present disclosure, when an average transmittance in a wavelength range of 600 nm-650 nm of the optical element including the multi-layer coating membrane is T6065, the following condition can be satisfied: 70%≤T6065. Therefore, the multi-layer coating membrane can have an excellent effect on the penetration of the visible light. Furthermore, the following condition can be satisfied: 75%≤T6065. Furthermore, the following condition can be satisfied: 80%≤T6065. Furthermore, the following condition can be satisfied: 85%≤T6065≤90%. Furthermore, the following condition can be satisfied: 90%≤T6065≤100%.

According to the optical lens assembly of the present disclosure, when an average transmittance in a wavelength range of 700 nm-800 nm of the optical element including the multi-layer coating membrane is T7080, the following condition can be satisfied: T7080≤3%. Therefore, the multi-layer coating membrane can have an excellent near-infrared light filtering function. Furthermore, the following condition can be satisfied: T7080≤2%. Furthermore, the following condition can be satisfied: T7080≤1%. Furthermore, the following condition can be satisfied: T7080≤0.5%. Furthermore, the following condition can be satisfied: 0%≤T7080≤0.3%.

According to the optical lens assembly of the present disclosure, when a transmittance at a wavelength of 450 nm of the optical element including the multi-layer coating membrane is T45, the following condition can be satisfied: 70%≤T45. Therefore, the multi-layer coating membrane can have an excellent effect on the penetration of the blue light. Furthermore, the following condition can be satisfied: 80%≤T45. Furthermore, the following condition can be satisfied: 85%≤T45. Furthermore, the following condition can be satisfied: 90%≤T45≤95%. Furthermore, the following condition can be satisfied: 95%≤T45≤100%.

According to the optical lens assembly of the present disclosure, when a transmittance at a wavelength of 550 nm of the optical element including the multi-layer coating membrane is T55, the following condition can be satisfied: 70%≤T55. Therefore, the multi-layer coating membrane can have an excellent effect on the penetration of the green light. Furthermore, the following condition can be satisfied: 80%≤T55. Furthermore, the following condition can be satisfied: 85%≤T55. Furthermore, the following condition can be satisfied: 90%≤T55. Furthermore, the following condition can be satisfied: 95%≤T55≤100%.

According to the optical lens assembly of the present disclosure, when a transmittance at a wavelength of 650 nm of the optical element including the multi-layer coating membrane is T65, the following condition can be satisfied: 30%≤T65. Therefore, the multi-layer coating membrane can have an excellent effect on the penetration of the red light. Furthermore, the following condition can be satisfied: 40%≤T65. Furthermore, the following condition can be satisfied: 50%≤T65. Furthermore, the following condition can be satisfied: 75%≤T65. Furthermore, the following condition can be satisfied: 90%≤T65≤100%.

In the multi-layer coating membrane of the present disclosure, when a total thickness of the multi-layer coating membrane is tTk, the following condition can be satisfied: 1000 nm≤tTk≤20000 nm. Therefore, by controlling the total thickness of the multi-layer coating membrane, it is favorable for maintaining overall coating integrity of the multi-layer coating membrane so as to achieve an optimal filtrating effect. Furthermore, the following condition can be satisfied: 2000 nm≤tTk≤18000 nm. Furthermore, the following condition can be satisfied: 3000 nm≤tTk≤15000 nm. Furthermore, the following condition can be satisfied: 4000 nm≤tTk≤12000 nm. Furthermore, the following condition can be satisfied: 5000 nm≤tTk≤10000 nm.

The multi-layer coating membrane of the present disclosure includes high refractive index layers (refractive index≥1.9) and low refractive index layers (refractive index<1.9) and is formed by alternately stacking the high refractive index layers and the low refractive index layers, wherein the material of the multi-layer coating membrane can be (values in parentheses are refractive indices at wavelength=587.6 nm): $MgF_2$ (1.3777), $SiO_2$ (1.4585), $ThF_4$ (1.5125), SiO (1.55), $CeF_3$ (1.63), $Al_2O_3$ (1.7682), $Y_2O_3$ (1.79), $HfO_2$ (1.8935), ZnO (1.9269), $Sc_2O_3$ (1.9872), AlN (2.0294), $Si_3N_4$ (2.0381), $Ta_2O_5$ (2.1306), $ZrO_2$ (2.1588), ZnS (2.2719), $Nb_2O_5$ (2.3403), $TiO_2$ (2.6142) or TiN (3.1307). Furthermore, the material of the multi-layer coating membrane can be a mixture of $MgF_2$ and $SiO_2$ (content ratio: $[SiO_2]>[MgF_2]$).

The total number of layers of the multi-layer coating membrane of the present disclosure is a total number of layers of the multi-layer coating membrane that has a dual-bandpass filtering function or can reduce the difference of transmittance between each of the angles. The total thickness of the multi-layer coating membrane is a total thickness of the dual-bandpass filtering membrane that has a dual-bandpass filtering function or can reduce the difference of transmittance between each of the angles. The total number of layers and the total thickness of the multi-layer coating membrane is the sum of the number of layers and the thickness of the multi-layer coating membrane on the object-side surface and the image-side surface, wherein the multi-layer coating membrane has a dual-bandpass filtering function or can reduce the difference of transmittance between each of the angles.

The multi-layer coating membrane of the present disclosure can be simultaneously disposed on both of an object-side surface and an image-side surface of an optical element, the numbers of layers and the thicknesses thereof on the object-side surface and the image-side surface are interchangeable, and the deformation thereof is less compared with the optical element with multi-layer coating membrane disposed on one side.

In the multi-layer coating membrane of the present disclosure, the transmittance difference between different angles can be the transmittance difference between 0 degrees angle and non-0 degrees angles, wherein one of the non-0 degrees angles can be 5 degrees, 10 degrees, 15 degrees, 20 degrees, 25 degrees, 30 degrees, 35 degrees, 40 degrees, 45 degrees, 50 degrees or another angle less than 90 degrees, but the present disclosure is not limited thereto.

The multi-layer coating membrane of the present disclosure can be formed by a liquid phase coating method or a vapor phase coating method. The liquid phase coating method can be the acid etching method, the solution deposition method, the electroplating method, the anodizing method, the sol-gel method, Langmuir-Blodgett film or liquid phase epitaxy, etc., but the present disclosure is not limited thereto. The vapor phase coating method can be the chemical vapor coating method or the physical vapor coating method, but the present disclosure is not limited thereto. Furthermore, if the curvature of the coated lens element has a greater change, the atomic layer deposition (ALD) should be used so as to achieve the best uniformity of the membrane, so that the integral efficacy of the multi-layer coating membrane can be ensured.

The multi-layer coating membrane of the present disclosure can be used in combination with a graded index membrane. The combined arrangement that the multi-layer coating membrane coated with the graded index membrane thereon can perform an excellent anti-reflection effect. Thus, the serious reflection problems in the peripheral region of the lens element caused by the large angle of light incident on the surface thereof can be reduced, so that the light transmittance of the optical lens assembly can be improved effectively so as to achieve the best anti-reflection effect.

The dual-bandpass filtering membrane of the present disclosure means a multi-layer coating membrane has two bands with high transmittance and other bands with low transmittances. The band with high transmittance can range from 450 nm to 630 nm and from 830 nm to 870 nm; the band with low transmittance can range from 350 nm to 400 nm; the band with low transmittance can range from 700 nm to 760 nm; or the band with low transmittance can range from 700 nm to 1050 nm. The band with high transmittance can be adjusted according to the design. The band with high transmittance can range from 400 nm to 500 nm; the band with high transmittance can range from 500 nm to 600 nm; the band with high transmittance can range from 600 nm to 650 nm; or the band with high transmittance can be any band within the range of the visible light, but the present disclosure is not limited thereto. The band with low transmittance can be adjusted according to the design. The band with low transmittance can range from 650 nm to 700 nm; the band with low transmittance can range from 650 nm to 750 nm; the band with low transmittance can range from 700 nm to 800 nm, or the band with low transmittance can be any band within the non-visible light range, but the present disclosure is not limited thereto.

The dual-bandpass filtering membrane of the present disclosure can be applied not only to the identification function of near-infrared light sensing but also to the day/night optical lens assembly.

The near-infrared light described in the present disclosure has a specific wavelength, wherein the wavelength of the near-infrared light can be 850 nm, the wavelength of the near-infrared light can be 940 nm, the wavelength of the near-infrared light can be 1050 nm, or other wavelengths that can be applied to near-infrared light sensing systems, but the present disclosure is not limited thereto. The band of the near-infrared light can be 850±30 nm; the band of the near-infrared light can be 850±25 nm; the band of the near-infrared light can be 850±20 nm; the band of the near-infrared light can be 850±15 nm; the band of the near-infrared light can be 850±10 nm; or the band of the near-infrared light can be 850±5 nm. The band of the near-infrared light can be 940±30 nm; the band of the near-infrared light can be 940±25 nm; the band of the near-infrared light can be 940±20 nm; the band of the near-infrared light can be 940±15 nm; the band of the near-infrared light can be 940±10 nm; or the band of the near-infrared light can be 940±5 nm. The band of the near-infrared light can be 1050±30 nm; the band of the near-infrared light can be 1050±25 nm; the band of the near-infrared light can be 1050±20 nm; the band of the near-infrared light can be 1050±15 nm; the band of the near-infrared light can be 1050±10 nm; or the band of the near-infrared light can be 1050±5 nm. The wavelength of the near-infrared light can be replaced with the visible light with the wavelength of 450 nm, the wavelength of the near-infrared light can be replaced with the visible light with the wavelength of 550 nm, or the wavelength of the near-infrared light can be replaced with the visible light with the wavelength of 650 nm.

The near-infrared light described in the present disclosure can be applied to the identification function. The identification function can be distance sensing, depth sensing, time-of-flight ranging, face recognition, fingerprint recognition, iris recognition, blood oxygen sensing, 3D sensing or LiDAR, but the present disclosure is not limited thereto.

The wavelength of the optical element including the multi-layer coating membrane of the present disclosure at 50% transmittance of long-wavelength visible light is Wt50v, wherein there will be different wavelength values at different angles, and the angle can be 0 degrees, 30 degrees or other degrees. The wavelength of the optical element including the multi-layer coating membrane of the present disclosure at 50% transmittance of long-wavelength near-infrared light is Wt50i, wherein there will be different wavelength values at different angles, and the angle can be 0 degrees, 30 degrees or other degrees.

The optical element of the present disclosure includes the multi-layer coating membrane, and a wavelength difference between an incidence at 0 degrees and an incidence at 30 degrees of the optical element including the multi-layer coating membrane at 50% transmittance of long-wavelength visible light is dWt50v, wherein dWt50v is the value of the wavelength at 50% transmittance of long-wavelength visible light in the incidence at 0 degrees minus the value of the wavelength at 50% transmittance of long-wavelength visible light in the incidence at 30 degrees. The wavelength difference between an incidence at 0 degrees and an incidence at 30 degrees of the optical element including the multi-layer coating membrane at 50% transmittance of long-wavelength near-infrared light is dWt50i, wherein dWt50i is the value of wavelength at 50% transmittance of long-wavelength near-infrared light in the incidence at 0 degrees minus the value of the wavelength at 50% transmittance of long-wavelength near-infrared light in the incidence at 30 degrees.

The proportion of the total transmittance difference of the optical element including the multi-layer coating membrane is calculated by that the incident light at 0 degrees and the incident light at 30 degrees in the range of 600 nm to 700 nm of the long-wavelength visible light, or in the range of 850 nm to 1000 nm of the long-wavelength near-infrared light, are integrated and subtracted with the unit of 1 nm and percentage, and then is divided by the integrated values of the long-wavelength visible light of 600 nm to 700 nm or the long-wavelength near-infrared light of 850 nm to 1000 nm incident in the same wavelength range at the angle of 0 degrees.

The optical element including multi-layer coating membrane of the present disclosure has a target wavelength of 650 nm in the average wavelength of the incidence at 0 degrees and the incidence at 30 degrees at 50% transmittance of the long-wavelength visible light. The average wavelength between the incidence at 0 degrees and the incidence at 30 degrees of the optical element including the multi-layer coating membrane at 50% transmittance of long-wavelength visible light can be 650±30 nm; the average wavelength between the incidence at 0 degrees and the incidence at 30 degrees of the optical element including the multi-layer coating membrane at 50% transmittance of long-wavelength visible light can be 650±25 nm; the average wavelength between the incidence at 0 degrees and the incidence at 30 degrees of the optical element including the multi-layer coating membrane at 50% transmittance of long-wavelength visible light can be 650±20 nm; the average wavelength between the incidence at 0 degrees and the incidence at 30 degrees of the optical element including the multi-layer coating membrane at 50% transmittance of long-wavelength visible light can be 650±15 nm; the average wavelength between the incidence at 0 degrees and the incidence at 30 degrees of the optical element including the multi-layer coating membrane at 50% transmittance of long-wavelength visible light can be 650±10 nm; or the average wavelength between the incidence at 0 degrees and the incidence at 30 degrees of the optical element including the multi-layer coating membrane at 50% transmittance of long-wavelength visible light can be 650±5 nm. Further, the target wavelength can be changed according to the band applied in the product. The target wavelength between the incidence at 0 degrees and the incidence at 30 degrees of the optical element including the multi-layer coating membrane at 50% transmittance of long-wavelength visible light can be 450 nm; the target wavelength between the incidence at 0 degrees and the incidence at 30 degrees of the optical element including the multi-layer coating membrane at 50% transmittance of long-wavelength visible light can be 550 nm; or the target wavelength between the incidence at 0 degrees and the incidence at 30 degrees of the optical element including the multi-layer coating membrane at 50% transmittance of long-wavelength visible light can be 650 nm. Furthermore, the long-wavelength visible light can be replaced with the long-wavelength near-infrared light. The target wavelength between the incidence at 0 degrees and the incidence at 30 degrees of the optical element including the multi-layer coating membrane at 50% transmittance of long-wavelength near-infrared light can be 840 nm; the target wavelength between the incidence at 0 degrees and the incidence at 30 degrees of the optical element including the multi-layer coating membrane at 50% transmittance of long-wavelength near-infrared light can be 940 nm; the target wavelength between the incidence at 0 degrees and the incidence at 30 degrees of the optical element including the multi-layer coating membrane at 50% transmittance of long-wavelength near-infrared light can be 1050 nm; or the target wavelength between the incidence at 0 degrees and the incidence at 30 degrees of the optical element including the multi-layer coating membrane at 50% transmittance of long-wavelength near-infrared light can be an one of the wavelength between 350 nm to 1050 nm, but the present disclosure is not limited thereto.

The incident angle of the transmittance of the optical element of the present disclosure is measured based on the 0 degrees angle as the default standard, and the non-0 degrees angle data will be further specified and marked.

The optical element of the present disclosure is a light-transmitting element in the optical lens assembly, and the light-transmitting element can be an optical lens element, a prism or a plate element, wherein the optical lens element, the prism or the plate element can be made of a glass or a plastic material.

The slope from the center position to the position of the maximum effective diameter of the optical lens element (SPsd) of the present disclosure is calculated by that the vertical height (SD) of the optical lens element at the position of the maximum effective diameter is divided by the horizontal displacement of the optical lens element at the position of the maximum effective diameter (SD_SAG), and the calculation formula is SPsd=SD/SD_SAG. The slope from the center position to the position of the maximum horizontal displacement of the optical lens element (SPmax) is calculated by that the vertical height of the optical lens element at the maximum horizontal displacement position (SAGMAX_SD) is divided by the horizontal displacement of the optical lens element at the maximum horizontal displacement position (SAGMAX), and the calculation formula is SPmax=SAGMAX_SD/SAGMAX. The slope from the position of the maximum horizontal displacement to the position of the maximum effective diameter of the optical lens element (SPbi) is calculated by that the difference between the vertical height at the position of the maximum effective diameter on the surface of the optical lens element and the vertical height difference of the optical lens element at the position of the maximum horizontal displacement (SD-SAGMAX_SD), is divided by the difference between the horizontal displacement of the optical lens element at the maximum effective diameter position and the horizontal displacement of the optical lens element at the maximum horizontal displacement position (SD_SAG-SAGMAX), and the calculation formula is SPbi=(SD-SAGMAX_SD)/(SD_SAG-SAGMAX).

When the following conditions of the surface that the multi-layer coating membrane of the present disclosure is disposed on are satisfied, a better flatness thereof can be obtained: the slope from the position of the maximum horizontal displacement to the position of the maximum effective diameter of the optical lens element is larger than 7.5, the slope from the center position to the position of the maximum horizontal displacement of the optical lens element is larger than 7.5, or the slope from the center position to the position of the maximum effective diameter of the optical lens element is larger than 7.5. When the multi-layer coating membrane is disposed on a surface with a better flatness, a better coating uniformity can be obtained.

The optical lens element of the present disclosure is made of a plastic material, so the surface shape change error thereof will be too large due to high temperature, especially when the thickness of the lens element is too small. Thus, by the lens compensating technology, the problem of temperature effect when coating on the plastic surface can be effectively solved, so that it is favorable for maintaining the integrity of the coating on the lens element and the high precision of the plastic lens element, and it is the key technology for achieving the high quality of the optical lens assembly. The lens compensating technology can be the moldflow analysis method, the curve fitting method or the wavefront error method, but the present disclosure is not limited thereto. The moldflow analysis method is to find the three-dimensional contour nodes of the lens surface shrinking in the Z-axis through mold flow analysis, and then the three-dimensional contour nodes are converted into an aspherical curve so as to compare with the original curve to find the difference there between. At the same time, the material shrinkage rate and the surface deformation trend are considered so as to calculate and obtain the compensation value. The curve fitting method is to measure the surface contour error of the element, then the curve fitting is performed based on a function, and then an optimization algorithm method is used to approximate the fitted curve to the measurement point so as to obtain the compensation value. The function can be exponential or polynomial, and the algorithm method can be Gauss Newton method, the simplex algorithm method or the steepest descent method, etc. The wavefront error method is to measure the wavefront error (imaging error) data by the interferometer, the wavefront error generated by the manufacturing and the assembly is comprehensively analyzed by the original design value of the wavefront error and then is optimized by an optical software so as to obtain the compensation value.

Each of the aforementioned features of the optical lens assembly of the present disclosure can be utilized in numerous combinations, so as to achieve the corresponding functionality.

The present disclosure further provides an imaging apparatus including the aforementioned optical lens assembly and an image sensor, and the image sensor is disposed on an image surface of the optical lens assembly. Preferably, the imaging apparatus can further include a barrel member, a holder member, or a combination thereof.

The present disclosure further provides an electronic device including the aforementioned imaging apparatus. Therefore, the imaging quality can be effectively enhanced. Preferably, the electronic device can further include but not be limited to a control unit, a display, a storage unit, a random-access memory (RAM), a read-only memory (ROM), or the combination thereof. Furthermore, the electronic device of the present disclosure can be a camera, a cell phone, a portable computer, a handheld game console, a home game console, a head-mounted device, a car device or a vehicle device, but the present disclosure is not limited thereto.

According to the above descriptions, the specific embodiments and reference drawings thereof are given below so as to describe the present disclosure in detail.

Comparative Example 1

The optical lens assembly of Comparative example 1 includes at least one optical element, the at least one optical element includes a multi-layer coating membrane, and the multi-layer coating membrane is formed by alternately stacking high refractive index layers and low refractive index layers.

FIG. 1 is a relationship diagram between transmittances and wavelengths of an optical element including a multi-layer coating membrane according to Comparative example 1, and Table 1A shows the values of transmittance in a wavelength range of 350 nm-1050 nm of the optical element including the multi-layer coating membrane of Comparative example 1, wherein the incidence angles of the light entering the optical element including the multi-layer coating membrane of Comparative example 1 are 0 degrees and 30 degrees, respectively.

TABLE 1A

| Transmittance of Comparative example 1 (%) | | |
|---|---|---|
| Wavelength (nm) | 0 degrees | 30 degrees |
| 350 | 1.44 | 0.18 |
| 355 | 0.68 | 0.26 |
| 360 | 0.26 | 0.10 |
| 365 | 0.36 | 0.08 |
| 370 | 0.12 | 0.13 |
| 375 | 0.10 | 0.28 |
| 380 | 0.16 | 2.18 |
| 385 | 0.27 | 7.66 |
| 390 | 1.27 | 6.62 |
| 395 | 4.44 | 62.86 |
| 400 | 9.59 | 72.14 |
| 405 | 36.12 | 83.59 |
| 410 | 79.90 | 86.02 |
| 415 | 87.27 | 87.62 |
| 420 | 89.30 | 87.88 |
| 425 | 90.38 | 88.06 |
| 430 | 91.18 | 88.32 |
| 435 | 92.49 | 88.53 |
| 440 | 94.15 | 92.25 |
| 445 | 94.83 | 91.61 |
| 450 | 95.12 | 88.09 |
| 455 | 95.50 | 91.81 |
| 460 | 95.50 | 94.95 |
| 465 | 95.60 | 93.83 |
| 470 | 95.35 | 91.99 |
| 475 | 95.78 | 94.84 |
| 480 | 95.89 | 93.74 |
| 485 | 96.06 | 93.78 |
| 490 | 96.35 | 95.46 |
| 495 | 97.08 | 96.61 |
| 500 | 97.55 | 93.47 |
| 505 | 97.68 | 90.08 |
| 510 | 97.85 | 94.01 |
| 515 | 98.20 | 93.12 |
| 520 | 98.46 | 91.12 |
| 525 | 98.64 | 96.01 |
| 530 | 98.74 | 97.03 |
| 535 | 98.66 | 95.11 |
| 540 | 98.61 | 97.49 |
| 545 | 98.84 | 98.29 |
| 550 | 99.24 | 96.59 |
| 555 | 99.19 | 97.69 |
| 560 | 99.27 | 99.24 |
| 565 | 99.53 | 98.48 |
| 570 | 98.89 | 98.56 |
| 575 | 98.47 | 99.55 |
| 580 | 99.28 | 99.26 |
| 585 | 99.70 | 98.96 |
| 590 | 99.50 | 99.43 |
| 595 | 99.70 | 99.64 |
| 600 | 99.58 | 99.65 |
| 605 | 99.08 | 99.33 |
| 610 | 99.44 | 98.31 |
| 615 | 99.58 | 88.47 |
| 620 | 99.00 | 67.65 |
| 625 | 99.16 | 45.05 |
| 630 | 98.98 | 26.35 |
| 635 | 98.02 | 15.52 |
| 640 | 99.23 | 8.79 |
| 645 | 88.79 | 4.62 |
| 650 | 54.11 | 2.53 |
| 655 | 28.28 | 1.65 |
| 660 | 16.19 | 1.33 |
| 665 | 9.52 | 1.32 |
| 670 | 5.16 | 1.47 |

TABLE 1A-continued

| Transmittance of Comparative example 1 (%) | | |
|---|---|---|
| Wavelength (nm) | 0 degrees | 30 degrees |
| 675 | 2.77 | 1.51 |
| 680 | 1.68 | 1.32 |
| 685 | 1.24 | 1.14 |
| 690 | 1.12 | 1.15 |
| 695 | 1.20 | 1.27 |
| 700 | 1.38 | 1.25 |
| 705 | 1.38 | 0.88 |
| 710 | 1.17 | 0.48 |
| 715 | 1.01 | 0.29 |
| 720 | 1.05 | 0.22 |
| 725 | 1.28 | 0.20 |
| 730 | 1.24 | 0.19 |
| 735 | 0.70 | 0.17 |
| 740 | 0.36 | 0.13 |
| 745 | 0.22 | 0.09 |
| 750 | 0.17 | 0.06 |
| 755 | 0.15 | 0.04 |
| 760 | 0.15 | 0.04 |
| 765 | 0.14 | 0.04 |
| 770 | 0.10 | 0.04 |
| 775 | 0.07 | 0.05 |
| 780 | 0.04 | 0.06 |
| 785 | 0.03 | 0.07 |
| 790 | 0.03 | 0.07 |
| 795 | 0.02 | 0.06 |
| 800 | 0.03 | 0.05 |
| 805 | 0.03 | 0.04 |
| 810 | 0.04 | 0.04 |
| 815 | 0.05 | 0.04 |
| 820 | 0.05 | 0.05 |
| 825 | 0.04 | 0.07 |
| 830 | 0.03 | 0.09 |
| 835 | 0.02 | 0.15 |
| 840 | 0.02 | 0.29 |
| 845 | 0.02 | 0.60 |
| 850 | 0.02 | 1.28 |
| 855 | 0.02 | 2.49 |
| 860 | 0.03 | 3.11 |
| 865 | 0.04 | 2.18 |
| 870 | 0.06 | 1.15 |
| 875 | 0.10 | 0.61 |
| 880 | 0.21 | 0.35 |
| 885 | 0.45 | 0.22 |
| 890 | 0.85 | 0.15 |
| 895 | 1.08 | 0.11 |
| 900 | 1.02 | 0.09 |
| 905 | 0.85 | 0.08 |
| 910 | 0.61 | 0.07 |
| 915 | 0.37 | 0.06 |
| 920 | 0.22 | 0.06 |
| 925 | 0.14 | 0.06 |
| 930 | 0.09 | 0.06 |
| 935 | 0.07 | 0.07 |
| 940 | 0.05 | 0.07 |
| 945 | 0.05 | 0.07 |
| 950 | 0.04 | 0.07 |
| 955 | 0.04 | 0.08 |
| 960 | 0.04 | 0.09 |
| 965 | 0.04 | 0.10 |
| 970 | 0.04 | 0.11 |
| 975 | 0.04 | 0.14 |
| 980 | 0.04 | 0.17 |
| 985 | 0.04 | 0.21 |
| 990 | 0.04 | 0.26 |
| 995 | 0.04 | 0.32 |
| 1000 | 0.05 | 0.38 |
| 1005 | 0.05 | 0.44 |
| 1010 | 0.06 | 0.50 |
| 1015 | 0.07 | 0.55 |
| 1020 | 0.08 | 0.60 |
| 1025 | 0.09 | 0.66 |
| 1030 | 0.12 | 0.73 |
| 1035 | 0.15 | 0.83 |

TABLE 1A-continued

| Transmittance of Comparative example 1 (%) | | |
|---|---|---|
| Wavelength (nm) | 0 degrees | 30 degrees |
| 1040 | 0.20 | 0.96 |
| 1045 | 0.26 | 1.16 |
| 1050 | 0.33 | 1.42 |

Table 1B shows the values of parameters of the optical element including the multi-layer coating membrane of Comparative example 1 at the incidence angles of 0 degrees and 30 degrees, wherein Wt50v is a wavelength of the optical element including the multi-layer coating membrane at 50% transmittance of long-wavelength visible light, dWt50v is a wavelength difference between an incidence at 0 degrees and an incidence at 30 degrees of the optical element including the multi-layer coating membrane at 50% transmittance of long-wavelength visible light, Wt50avg is an average wavelength of the incidence at 0 degrees and the incidence at 30 degrees of the optical element including the multi-layer coating membrane at 50% transmittance of long-wavelength visible light, RdTv is a proportion of a total transmittance difference between the incidence at 0 degrees and the incidence at 30 degrees of the optical element including the multi-layer coating membrane in a wavelength range of 600 nm-700 nm of long-wavelength visible light, T3540 is an average transmittance in a wavelength range of 350 nm-400 nm of the optical element including the multi-layer coating membrane, T4050 is an average transmittance in a wavelength range of 400 nm-500 nm of the optical element including the multi-layer coating membrane, T4563 is an average transmittance in a wavelength range of 450 nm-630 nm of the optical element including the multi-layer coating membrane, T5060 is an average transmittance in a wavelength range of 500 nm-600 nm of the optical element including the multi-layer coating membrane, T6065 is an average transmittance in a wavelength range of 600 nm-650 nm of the optical element including the multi-layer coating membrane, T7076 is an average transmittance in a wavelength range of 700 nm-760 nm of the optical element including the multi-layer coating membrane, T7080 is an average transmittance in a wavelength range of 700 nm-800 nm of the optical element including the multi-layer coating membrane, T70105 is an average transmittance in a wavelength range of 700 nm-1050 nm of the optical element including the multi-layer coating membrane, T8387 is an average transmittance in a wavelength range of 830 nm-870 nm of the optical element including the multi-layer coating membrane, T45 is a transmittance at a wavelength of 450 nm of the optical element including the multi-layer coating membrane, T55 is a transmittance at a wavelength of 550 nm of the optical element including the multi-layer coating membrane, T65 is a transmittance at a wavelength of 650 nm of the optical element including the multi-layer coating membrane, and T85 is a transmittance at a wavelength of 850 nm of the optical element including the multi-layer coating membrane.

TABLE 1B

| | 0 degrees | 30 degrees |
|---|---|---|
| Wt50v (nm) | 650.80 | 623.90 |
| \|dWt50v\| (nm) | | 26.90 |
| Wt50avg (nm) | | 637.35 |
| RdTv | | 0.48 |

TABLE 1B-continued

|  | 0 degrees | 30 degrees |
| --- | --- | --- |
| T3540 (%) | 1.70 | 13.86 |
| T4050 (%) | 86.71 | 90.22 |
| T4563 (%) | 98.08 | 91.70 |
| T5060 (%) | 98.84 | 96.80 |
| T6065 (%) | 94.09 | 50.57 |
| T7076 (%) | 0.79 | 0.31 |
| T7080 (%) | 0.51 | 0.21 |
| T70105 (%) | 0.27 | 0.39 |
| T8387 (%) | 0.03 | 1.26 |
| T45 (%) | 95.12 | 88.09 |
| T55 (%) | 99.24 | 96.59 |
| T65 (%) | 54.11 | 2.53 |
| T85 (%) | 0.02 | 1.28 |

The multi-layer coating membrane of Comparative example 1 can be disposed on the object-side surface or the image-side surface of the optical element, and a total number of layers of the multi-layer coating membrane tLs=44. The details of each layer of the multi-layer coating membrane of Comparative example 1 are shown in Table 1C, wherein "H" represents high refractive index layers, and "L" represents low refractive index layers.

TABLE 1C

| Layer Sequence | Material | Thickness (nm) |
| --- | --- | --- |
| 1 | H | 10.28 |
| 2 | L | 36.90 |
| 3 | H | 113.57 |
| 4 | L | 178.80 |
| 5 | H | 116.57 |
| 6 | L | 185.55 |
| 7 | H | 117.38 |
| 8 | L | 186.47 |
| 9 | H | 118.14 |
| 10 | L | 185.82 |
| 11 | H | 116.27 |
| 12 | L | 182.76 |
| 13 | H | 113.84 |
| 14 | L | 175.64 |
| 15 | H | 107.01 |
| 16 | L | 169.76 |
| 17 | H | 106.67 |
| 18 | L | 169.77 |
| 19 | H | 97.82 |
| 20 | L | 148.74 |
| 21 | H | 88.67 |
| 22 | L | 146.20 |
| 23 | H | 94.33 |
| 24 | L | 167.66 |
| 25 | H | 101.28 |
| 26 | L | 153.74 |
| 27 | H | 86.44 |
| 28 | L | 138.46 |
| 29 | H | 80.30 |
| 30 | L | 135.69 |
| 31 | H | 79.25 |
| 32 | L | 134.38 |
| 33 | H | 79.30 |
| 34 | L | 134.32 |
| 35 | H | 79.02 |
| 36 | L | 134.41 |
| 37 | H | 78.81 |
| 38 | L | 136.42 |
| 39 | H | 80.36 |
| 40 | L | 146.25 |
| 41 | H | 106.98 |
| 42 | L | 17.01 |
| 43 | H | 104.99 |
| 44 | L | 75.27 |

Furthermore, as shown in Table 1D, tTk is a total thickness of the multi-layer coating membrane, LtTk is a total thickness of the low refractive index layer, HtTk is a total thickness of the high refractive index layer, NH is a refractive index of the high refractive index layer, and NL is a refractive index of the low refractive index layer.

TABLE 1D

| tTk (nm) | 5217.30 | LtTk/HtTk | 1.51 |
| --- | --- | --- | --- |
| LtTk (nm) | 3140.02 | NH | 2.35 |
| HtTk (nm) | 2077.28 | NL | 1.46 |

The total number of layers of the multi-layer coating membrane of Comparative example 1 is 44, which is not up to the effective range of 65 layers to 200 layers and is without the dual-bandpass filtering function. Further, a ratio of the total thickness of the low refractive index layer and the total thickness of the high refractive index layer LtTk/HtTk is 1.51, which does not fall within the effective range of 1.0 to 1.5 and is without the function of reducing the difference between transmittance at 0 degrees and non-0 degrees of the long-wavelength visible light.

Furthermore, if the definitions of parameters shown in tables of the following comparative examples or examples are the same as those shown in Table 1A to Table 1D, those will not be described again.

Comparative Example 2

The optical lens assembly of Comparative example 2 includes at least one optical element, the at least one optical element includes a multi-layer coating membrane, and the multi-layer coating membrane is formed by alternately stacking high refractive index layers and low refractive index layers.

Figure 2:
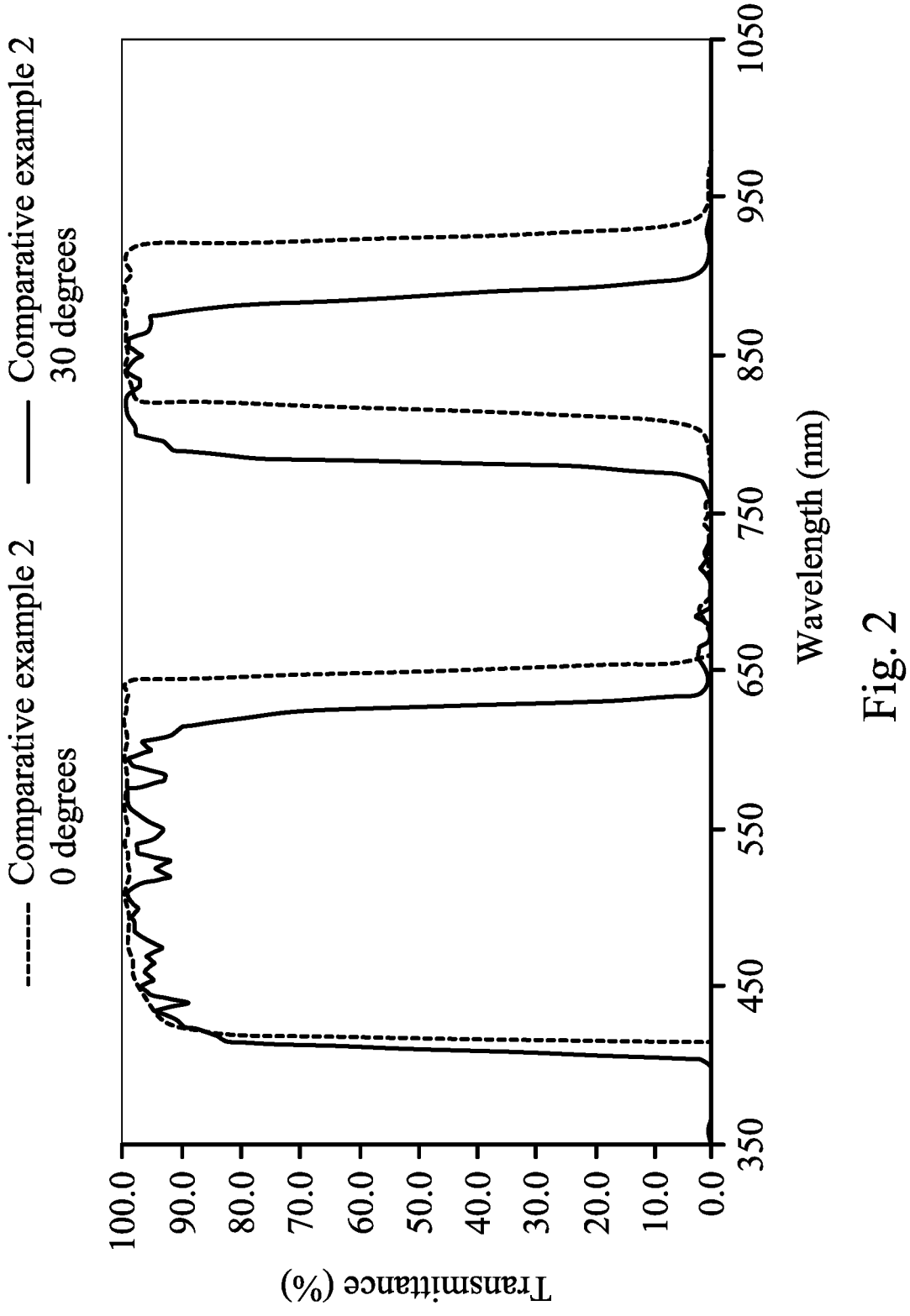
FIG. 2 is a relationship diagram between transmittances and wavelengths of an optical element including a multi-layer coating membrane according to Comparative example 2.

FIG. 2 is a relationship diagram between transmittances and wavelengths of an optical element including a multi-layer coating membrane according to Comparative example 2, and Table 2A shows the values of transmittance in a wavelength range of 350 nm-1050 nm of the optical element including the multi-layer coating membrane of Comparative example 2, wherein the incidence angles of the light entering the optical element including the multi-layer coating membrane of Comparative example 2 are 0 degrees and 30 degrees, respectively.

TABLE 2A

| Transmittance of Comparative example 2 (%) | | |
| --- | --- | --- |
| Wavelength (nm) | 0 degrees | 30 degrees |
| 350 | 0.01 | 0.00 |
| 355 | 0.00 | 0.00 |
| 360 | 0.00 | 0.27 |
| 365 | 0.00 | 0.00 |
| 370 | 0.00 | 0.00 |
| 375 | 0.00 | 0.01 |
| 380 | 0.00 | 0.00 |
| 385 | 0.00 | 0.00 |
| 390 | 0.00 | 0.00 |
| 395 | 0.02 | 0.06 |
| 400 | 0.00 | 0.07 |
| 405 | 0.01 | 1.83 |
| 410 | 0.20 | 43.11 |
| 415 | 0.58 | 82.20 |
| 420 | 82.97 | 84.31 |
| 425 | 91.21 | 89.61 |
| 430 | 93.33 | 91.01 |
| 435 | 94.68 | 94.70 |
| 440 | 95.64 | 88.98 |
| 445 | 96.55 | 95.06 |
| 450 | 97.22 | 97.15 |

TABLE 2A-continued

| Transmittance of Comparative example 2 (%) | | |
|---|---|---|
| Wavelength (nm) | 0 degrees | 30 degrees |
| 455 | 97.59 | 94.86 |
| 460 | 98.14 | 96.36 |
| 465 | 97.97 | 94.74 |
| 470 | 98.78 | 95.84 |
| 475 | 98.85 | 93.41 |
| 480 | 98.82 | 95.33 |
| 485 | 99.10 | 98.04 |
| 490 | 98.98 | 98.09 |
| 495 | 99.11 | 98.53 |
| 500 | 98.85 | 97.41 |
| 505 | 99.69 | 98.93 |
| 510 | 99.23 | 99.40 |
| 515 | 99.49 | 97.13 |
| 520 | 98.85 | 91.85 |
| 525 | 98.91 | 94.57 |
| 530 | 99.52 | 91.96 |
| 535 | 99.05 | 97.42 |
| 540 | 99.63 | 97.64 |
| 545 | 99.42 | 94.42 |
| 550 | 98.92 | 92.90 |
| 555 | 99.54 | 95.73 |
| 560 | 99.85 | 97.56 |
| 565 | 98.98 | 99.16 |
| 570 | 99.64 | 99.21 |
| 575 | 99.30 | 99.35 |
| 580 | 99.20 | 92.99 |
| 585 | 99.49 | 92.63 |
| 590 | 99.49 | 98.14 |
| 595 | 98.64 | 99.17 |
| 600 | 99.66 | 95.33 |
| 605 | 99.09 | 96.74 |
| 610 | 99.12 | 91.66 |
| 615 | 99.60 | 90.04 |
| 620 | 99.96 | 81.39 |
| 625 | 99.46 | 70.01 |
| 630 | 99.30 | 24.06 |
| 635 | 98.93 | 2.70 |
| 640 | 99.98 | 0.80 |
| 645 | 98.85 | 0.57 |
| 650 | 49.93 | 0.87 |
| 655 | 4.59 | 1.63 |
| 660 | 0.88 | 2.21 |
| 665 | 0.36 | 1.92 |
| 670 | 0.28 | 0.39 |
| 675 | 0.41 | 0.19 |
| 680 | 0.89 | 0.27 |
| 685 | 1.44 | 2.62 |
| 690 | 1.94 | 0.24 |
| 695 | 0.49 | 0.07 |
| 700 | 0.17 | 0.06 |
| 705 | 0.14 | 0.10 |
| 710 | 0.42 | 0.50 |
| 715 | 1.01 | 1.74 |
| 720 | 0.10 | 0.76 |
| 725 | 0.05 | 1.10 |
| 730 | 0.05 | 0.64 |
| 735 | 0.10 | 0.19 |
| 740 | 0.56 | 0.11 |
| 745 | 1.38 | 0.10 |
| 750 | 0.71 | 0.13 |
| 755 | 1.29 | 0.20 |
| 760 | 0.49 | 0.37 |
| 765 | 0.14 | 0.74 |
| 770 | 0.08 | 1.75 |
| 775 | 0.08 | 5.48 |
| 780 | 0.10 | 23.49 |
| 785 | 0.17 | 76.23 |
| 790 | 0.34 | 91.50 |
| 795 | 0.67 | 92.92 |
| 800 | 1.28 | 97.78 |
| 805 | 2.89 | 98.05 |
| 810 | 9.25 | 98.89 |
| 815 | 41.80 | 99.30 |
| 820 | 97.60 | 99.55 |
| 825 | 97.79 | 99.01 |
| 830 | 99.27 | 96.97 |

TABLE 2A-continued

| Transmittance of Comparative example 2 (%) | | |
|---|---|---|
| Wavelength (nm) | 0 degrees | 30 degrees |
| 835 | 98.65 | 97.17 |
| 840 | 98.81 | 99.34 |
| 845 | 99.94 | 98.43 |
| 850 | 99.01 | 96.77 |
| 855 | 98.69 | 98.71 |
| 860 | 99.67 | 99.15 |
| 865 | 99.64 | 95.51 |
| 870 | 99.24 | 95.02 |
| 875 | 99.74 | 95.48 |
| 880 | 99.75 | 85.67 |
| 885 | 99.20 | 59.15 |
| 890 | 99.67 | 39.83 |
| 895 | 99.87 | 11.78 |
| 900 | 98.67 | 3.07 |
| 905 | 98.90 | 1.14 |
| 910 | 99.95 | 0.59 |
| 915 | 99.13 | 0.41 |
| 920 | 97.95 | 0.39 |
| 925 | 49.64 | 0.46 |
| 930 | 11.05 | 0.45 |
| 935 | 2.96 | 0.21 |
| 940 | 1.11 | 0.09 |
| 945 | 0.56 | 0.05 |
| 950 | 0.37 | 0.03 |
| 955 | 0.32 | 0.03 |
| 960 | 0.35 | 0.03 |
| 965 | 0.40 | 0.05 |
| 970 | 0.26 | 0.06 |
| 975 | 0.11 | 0.03 |
| 980 | 0.05 | 0.01 |
| 985 | 0.03 | 0.00 |
| 990 | 0.02 | 0.00 |
| 995 | 0.02 | 0.00 |
| 1000 | 0.02 | 0.00 |
| 1005 | 0.04 | 0.00 |
| 1010 | 0.05 | 0.00 |
| 1015 | 0.02 | 0.00 |
| 1020 | 0.01 | 0.00 |
| 1025 | 0.00 | 0.00 |
| 1030 | 0.00 | 0.00 |
| 1035 | 0.00 | 0.00 |
| 1040 | 0.00 | 0.00 |
| 1045 | 0.00 | 0.00 |
| 1050 | 0.00 | 0.00 |

Table 2B shows the values of Wt50v, |dWt50v|, Wt50i, |dWt50i|, Wt50avg, RdTv, RdTi, T3540, T4050, T4563, T5060, T6065, T7076, T7080, T70105, T8387, T45, T55, T65 and T85 of the optical element including the multi-layer coating membrane of Comparative example 2 at the incidence angles of 0 degrees and 30 degrees, wherein Wt50i is a wavelength of the optical element including the multi-layer coating membrane at 50% transmittance of long-wavelength near-infrared light, dWt50i is a wavelength difference between an incidence at 0 degrees and an incidence at 30 degrees of the optical element including the multi-layer coating membrane at 50% transmittance of long-wavelength near-infrared light, and RdTi is a proportion of a total transmittance difference between the incidence at 0 degrees and the incidence at 30 degrees of the optical element including the multi-layer coating membrane in a wavelength range of 850 nm-1000 nm of long-wavelength near-infrared light.

TABLE 2B

|  | 0 degrees | 30 degrees |
| --- | --- | --- |
| Wt50v (nm) | 650.00 | 627.20 |
| \|dWt50v\| (nm) |  | 22.80 |
| Wt50i (nm) | 924.96 | 887.37 |
| \|dWt50i\| (nm) |  | 37.59 |
| Wt50avg (nm) |  | 638.60 |
| RdTv |  | 0.47 |
| RdTi |  | 0.50 |
| T3540 (%) | 0.00 | 0.04 |
| T4050 (%) | 78.03 | 82.41 |
| T4563 (%) | 99.09 | 92.95 |
| T5060 (%) | 99.30 | 96.33 |
| T6065 (%) | 94.90 | 50.38 |
| T7076 (%) | 0.50 | 0.46 |
| T7080 (%) | 0.44 | 18.85 |
| T70105 (%) | 31.15 | 29.11 |
| T8387 (%) | 99.21 | 97.45 |
| T45 (%) | 97.22 | 97.15 |
| T55 (%) | 98.92 | 92.90 |
| T65 (%) | 49.93 | 0.87 |
| T85 (%) | 99.01 | 96.77 |

The multi-layer coating membrane of Comparative example 2 can be disposed on the object-side surface or the image-side surface of the optical element, and a total number of layers of the multi-layer coating membrane tLs=148. The details of each layer of the multi-layer coating membrane of Comparative example 2 are shown in Table 2C.

TABLE 2C

| Layer Sequence | Material | Thickness (nm) |
| --- | --- | --- |
| 1 | H | 15.01 |
| 2 | L | 33.34 |
| 3 | H | 37.58 |
| 4 | L | 27.09 |
| 5 | H | 11.39 |
| 6 | L | 31.30 |
| 7 | H | 6.12 |
| 8 | L | 109.51 |
| 9 | H | 9.95 |
| 10 | L | 220.97 |
| 11 | H | 13.01 |
| 12 | L | 194.19 |
| 13 | H | 15.38 |
| 14 | L | 36.39 |
| 15 | H | 10.31 |
| 16 | L | 139.51 |
| 17 | H | 26.97 |
| 18 | L | 7.23 |
| 19 | H | 70.46 |
| 20 | L | 29.56 |
| 21 | H | 123.07 |
| 22 | L | 36.07 |
| 23 | H | 110.50 |
| 24 | L | 17.43 |
| 25 | H | 10.11 |
| 26 | L | 39.12 |
| 27 | H | 106.51 |
| 28 | L | 33.83 |
| 29 | H | 8.72 |
| 30 | L | 31.65 |
| 31 | H | 81.92 |
| 32 | L | 5.27 |
| 33 | H | 24.47 |
| 34 | L | 51.23 |
| 35 | H | 86.54 |
| 36 | L | 4.72 |
| 37 | H | 23.73 |
| 38 | L | 57.09 |
| 39 | H | 21.04 |
| 40 | L | 2.71 |
| 41 | H | 92.65 |
| 42 | L | 40.74 |
| 43 | H | 100.86 |

TABLE 2C-continued

| Layer Sequence | Material | Thickness (nm) |
| --- | --- | --- |
| 44 | L | 137.22 |
| 45 | H | 28.63 |
| 46 | L | 3.57 |
| 47 | H | 73.64 |
| 48 | L | 16.59 |
| 49 | H | 87.19 |
| 50 | L | 29.98 |
| 51 | H | 6.18 |
| 52 | L | 119.24 |
| 53 | H | 102.68 |
| 54 | L | 25.24 |
| 55 | H | 9.17 |
| 56 | L | 190.91 |
| 57 | H | 22.70 |
| 58 | L | 21.06 |
| 59 | H | 73.75 |
| 60 | L | 2.33 |
| 61 | H | 7.31 |
| 62 | L | 15.79 |
| 63 | H | 22.31 |
| 64 | L | 172.28 |
| 65 | H | 99.80 |
| 66 | L | 203.95 |
| 67 | H | 21.70 |
| 68 | L | 44.90 |
| 69 | H | 41.73 |
| 70 | L | 21.40 |
| 71 | H | 34.65 |
| 72 | L | 29.06 |
| 73 | H | 4.66 |
| 74 | L | 149.76 |
| 75 | H | 14.95 |
| 76 | L | 16.31 |
| 77 | H | 100.25 |
| 78 | L | 39.09 |
| 79 | H | 6.17 |
| 80 | L | 130.18 |
| 81 | H | 33.84 |
| 82 | L | 13.18 |
| 83 | H | 66.79 |
| 84 | L | 32.41 |
| 85 | H | 21.87 |
| 86 | L | 163.29 |
| 87 | H | 8.18 |
| 88 | L | 18.02 |
| 89 | H | 82.43 |
| 90 | L | 169.20 |
| 91 | H | 75.13 |
| 92 | L | 3.76 |
| 93 | H | 31.35 |
| 94 | L | 181.90 |
| 95 | H | 27.75 |
| 96 | L | 6.42 |
| 97 | H | 75.77 |
| 98 | L | 29.56 |
| 99 | H | 16.66 |
| 100 | L | 154.02 |
| 101 | H | 6.31 |
| 102 | L | 30.98 |
| 103 | H | 75.67 |
| 104 | L | 16.47 |
| 105 | H | 10.79 |
| 106 | L | 125.49 |
| 107 | H | 23.10 |
| 108 | L | 5.66 |
| 109 | H | 36.25 |
| 110 | L | 5.64 |
| 111 | H | 23.96 |
| 112 | L | 146.02 |
| 113 | H | 15.25 |
| 114 | L | 22.91 |
| 115 | H | 81.32 |
| 116 | L | 9.63 |
| 117 | H | 33.59 |
| 118 | L | 185.39 |
| 119 | H | 108.99 |
| 120 | L | 184.93 |
| 121 | H | 106.83 |

TABLE 2C-continued

| Layer Sequence | Material | Thickness (nm) |
|---|---|---|
| 122 | L | 134.44 |
| 123 | H | 3.36 |
| 124 | L | 38.76 |
| 125 | H | 80.03 |
| 126 | L | 12.75 |
| 127 | H | 23.02 |
| 128 | L | 121.71 |
| 129 | H | 8.07 |
| 130 | L | 47.38 |
| 131 | H | 123.57 |
| 132 | L | 50.43 |
| 133 | H | 5.12 |
| 134 | L | 117.28 |
| 135 | H | 101.24 |
| 136 | L | 157.20 |
| 137 | H | 18.34 |
| 138 | L | 18.29 |
| 139 | H | 57.99 |
| 140 | L | 28.53 |
| 141 | H | 24.71 |
| 142 | L | 81.55 |
| 143 | H | 1.86 |
| 144 | L | 121.17 |
| 145 | H | 33.49 |
| 146 | L | 15.12 |
| 147 | H | 47.58 |
| 148 | L | 88.37 |

Table 2D shows the values of tTk, LtTk, HtTk, LtTk/HtTk, NH and NL of the multi-layer coating membrane of Comparative example 2.

TABLE 2D

| tTk (nm) | 8309.65 | LtTk/HtTk | 1.55 |
|---|---|---|---|
| LtTk (nm) | 5055.67 | NH | 2.45 |
| HtTk (nm) | 3253.98 | NL | 1.48 |

The total number of layers of the multi-layer coating membrane of Comparative example 2 is 148, which falls within the effective range of 65 layers to 200 layers and is with the dual-bandpass filtering function. However, in Comparative example 2, a ratio of the total thickness of the low refractive index layer and the total thickness of the high refractive index layer thereof LtTk/HtTk is 1.55, which does not fall within the effective range of 1.0 to 1.5 and is without the function of reducing the difference between transmittance at 0 degrees and non-0 degrees of the long-wavelength visible light.

Furthermore, if the definitions of parameters shown in tables of the following comparative examples or examples are the same as those shown in Table 1A to Table 2D, those will not be described again.

Example 1

The optical lens assembly of Example 1 includes at least one optical element, the at least one optical element includes a multi-layer coating membrane, and the multi-layer coating membrane is formed by alternately stacking high refractive index layers and low refractive index layers.

Figure 3:
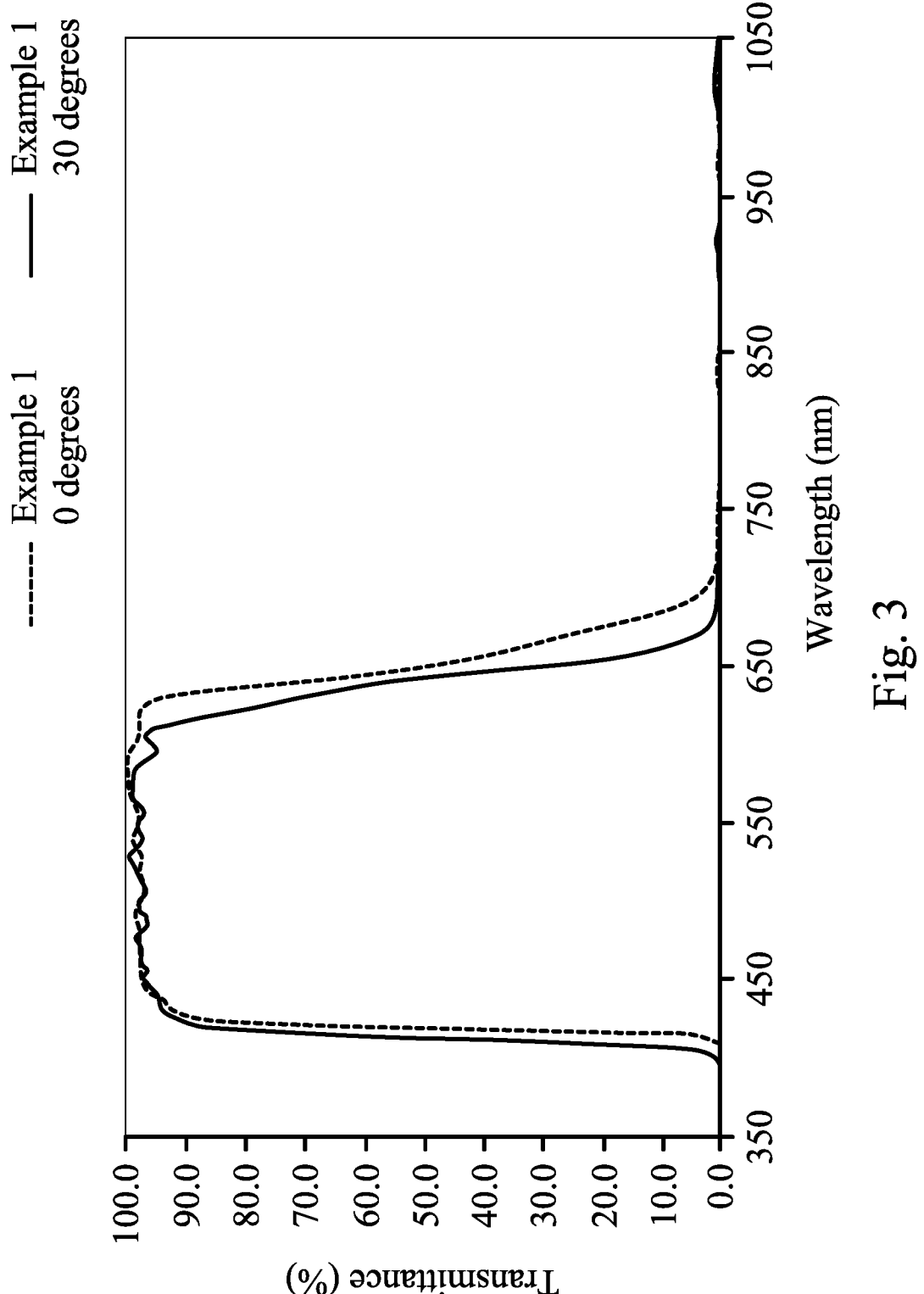
FIG. 3 is a relationship diagram between transmittances and wavelengths of an optical element including a multi-layer coating membrane of an optical lens assembly according to Example 1 of the present disclosure.

FIG. 3 is a relationship diagram between transmittances and wavelengths of an optical element including a multi-layer coating membrane of an optical lens assembly according to Example 1, and Table 3A shows the values of transmittance in a wavelength range of 350 nm-1050 nm of the optical element including the multi-layer coating membrane of Example 1, wherein the incidence angles of the light entering the optical element including the multi-layer coating membrane of Example 1 are 0 degrees and 30 degrees, respectively.

TABLE 3A

| | Transmittance of Example 1 (%) | |
|---|---|---|
| Wavelength (nm) | 0 degrees | 30 degrees |
| 350 | 0.25 | 0.01 |
| 355 | 0.03 | 0.01 |
| 360 | 0.01 | 0.02 |
| 365 | 0.01 | 0.00 |
| 370 | 0.00 | 0.01 |
| 375 | 0.00 | 0.01 |
| 380 | 0.00 | 0.01 |
| 385 | 0.00 | 0.02 |
| 390 | 0.00 | 0.04 |
| 395 | 0.01 | 0.12 |
| 400 | 0.02 | 0.58 |
| 405 | 0.09 | 3.82 |
| 410 | 0.52 | 26.11 |
| 415 | 5.12 | 65.67 |
| 420 | 63.50 | 87.28 |
| 425 | 87.54 | 91.33 |
| 430 | 92.86 | 93.86 |
| 435 | 92.88 | 94.52 |
| 440 | 95.46 | 94.87 |
| 445 | 97.04 | 95.92 |
| 450 | 96.91 | 97.20 |
| 455 | 97.51 | 96.54 |
| 460 | 97.71 | 97.54 |
| 465 | 97.54 | 97.64 |
| 470 | 97.72 | 97.65 |
| 475 | 98.00 | 98.42 |
| 480 | 97.89 | 97.91 |
| 485 | 98.08 | 96.59 |
| 490 | 98.86 | 96.81 |
| 495 | 98.60 | 98.07 |
| 500 | 97.68 | 97.84 |
| 505 | 97.43 | 96.87 |
| 510 | 97.12 | 97.20 |
| 515 | 97.43 | 97.96 |
| 520 | 98.04 | 98.35 |
| 525 | 97.62 | 99.31 |
| 530 | 97.57 | 99.53 |
| 535 | 98.73 | 98.14 |
| 540 | 99.20 | 97.54 |
| 545 | 98.47 | 98.16 |
| 550 | 97.99 | 97.98 |
| 555 | 98.02 | 97.30 |
| 560 | 98.34 | 97.88 |
| 565 | 99.04 | 99.00 |
| 570 | 99.65 | 99.22 |
| 575 | 99.30 | 99.02 |
| 580 | 98.70 | 99.07 |
| 585 | 99.02 | 98.38 |
| 590 | 99.80 | 96.51 |
| 595 | 99.75 | 95.22 |
| 600 | 98.85 | 95.86 |
| 605 | 98.12 | 97.04 |
| 610 | 97.89 | 95.65 |
| 615 | 97.84 | 90.46 |
| 620 | 97.81 | 83.11 |
| 625 | 96.98 | 75.74 |
| 630 | 92.80 | 69.46 |
| 635 | 83.27 | 63.84 |
| 640 | 70.46 | 56.21 |
| 645 | 58.31 | 43.99 |
| 650 | 48.71 | 29.84 |
| 655 | 41.53 | 18.40 |
| 660 | 35.95 | 10.93 |
| 665 | 30.92 | 6.44 |
| 670 | 25.49 | 3.80 |
| 675 | 19.53 | 2.26 |
| 680 | 13.89 | 1.40 |
| 685 | 9.40 | 0.92 |
| 690 | 6.15 | 0.66 |
| 695 | 3.91 | 0.52 |
| 700 | 2.44 | 0.45 |

TABLE 3A-continued

| Transmittance of Example 1 (%) | | |
| --- | --- | --- |
| Wavelength (nm) | 0 degrees | 30 degrees |
| 705 | 1.53 | 0.43 |
| 710 | 0.99 | 0.43 |
| 715 | 0.69 | 0.42 |
| 720 | 0.52 | 0.38 |
| 725 | 0.44 | 0.31 |
| 730 | 0.40 | 0.23 |
| 735 | 0.40 | 0.18 |
| 740 | 0.41 | 0.14 |
| 745 | 0.41 | 0.12 |
| 750 | 0.36 | 0.11 |
| 755 | 0.28 | 0.11 |
| 760 | 0.20 | 0.11 |
| 765 | 0.15 | 0.11 |
| 770 | 0.12 | 0.10 |
| 775 | 0.10 | 0.09 |
| 780 | 0.10 | 0.08 |
| 785 | 0.10 | 0.07 |
| 790 | 0.10 | 0.07 |
| 795 | 0.10 | 0.07 |
| 800 | 0.09 | 0.07 |
| 805 | 0.08 | 0.07 |
| 810 | 0.07 | 0.07 |
| 815 | 0.06 | 0.07 |
| 820 | 0.06 | 0.05 |
| 825 | 0.05 | 0.03 |
| 830 | 0.06 | 0.02 |
| 835 | 0.06 | 0.02 |
| 840 | 0.06 | 0.01 |
| 845 | 0.05 | 0.01 |
| 850 | 0.04 | 0.01 |
| 855 | 0.02 | 0.01 |
| 860 | 0.01 | 0.01 |
| 865 | 0.01 | 0.01 |
| 870 | 0.01 | 0.01 |
| 875 | 0.01 | 0.01 |
| 880 | 0.00 | 0.01 |
| 885 | 0.00 | 0.01 |
| 890 | 0.00 | 0.01 |
| 895 | 0.00 | 0.02 |
| 900 | 0.00 | 0.03 |
| 905 | 0.00 | 0.04 |
| 910 | 0.00 | 0.09 |
| 915 | 0.00 | 0.24 |
| 920 | 0.00 | 0.65 |
| 925 | 0.00 | 0.40 |
| 930 | 0.00 | 0.18 |
| 935 | 0.01 | 0.13 |
| 940 | 0.01 | 0.22 |
| 945 | 0.01 | 0.17 |
| 950 | 0.02 | 0.08 |
| 955 | 0.03 | 0.06 |
| 960 | 0.07 | 0.06 |
| 965 | 0.21 | 0.06 |
| 970 | 0.71 | 0.06 |
| 975 | 0.42 | 0.07 |
| 980 | 0.16 | 0.09 |
| 985 | 0.09 | 0.12 |
| 990 | 0.06 | 0.18 |
| 995 | 0.05 | 0.27 |
| 1000 | 0.04 | 0.43 |
| 1005 | 0.04 | 0.70 |
| 1010 | 0.04 | 0.99 |
| 1015 | 0.04 | 1.06 |
| 1020 | 0.05 | 0.95 |
| 1025 | 0.06 | 0.93 |
| 1030 | 0.08 | 0.99 |
| 1035 | 0.10 | 0.86 |
| 1040 | 0.14 | 0.69 |
| 1045 | 0.22 | 0.59 |
| 1050 | 0.36 | 0.55 |

Table 3B shows the values of Wt50v, |dWt50v|, Wt50avg, RdTv, T3540, T4050, T4563, T5060, T6065, T7076, T7080, T70105, T8387, T45, T55, T65 and T85 of the optical element including the multi-layer coating membrane of Example 1 at the incidence angles of 0 degrees and 30 degrees.

TABLE 3B

| | 0 degrees | 30 degrees |
| --- | --- | --- |
| Wt50v (nm) | 649.30 | 642.50 |
| |dWt50v| (nm) | | 6.80 |
| Wt50avg (nm) | | 645.90 |
| RdTv | | 0.25 |
| T3540 (%) | 0.03 | 0.07 |
| T4050 (%) | 76.74 | 82.20 |
| T4563 (%) | 98.05 | 95.73 |
| T5060 (%) | 98.46 | 97.92 |
| T6065 (%) | 85.55 | 72.84 |
| T7076 (%) | 0.70 | 0.26 |
| T7080 (%) | 0.47 | 0.20 |
| T70105 (%) | 0.19 | 0.23 |
| T8387 (%) | 0.03 | 0.01 |
| T45 (%) | 96.91 | 97.20 |
| T55 (%) | 97.99 | 97.98 |
| T65 (%) | 48.71 | 29.84 |
| T85 (%) | 0.04 | 0.01 |

The multi-layer coating membrane of Example 1 is disposed on both of the object-side surface and the image-side surface of the optical element, and a total number of layers of the multi-layer coating membrane tLs=64. The details of each layer of the multi-layer coating membrane on the object-side surface of optical element of Example 1 are shown in Table 3C, and details of each layer of the multi-layer coating membrane on the image-side surface of optical element of Example 1 are shown in Table 3D.

TABLE 3C

| Details of each layer of the multi-layer coating membrane on the object-side surface of Example 1 | | |
| --- | --- | --- |
| Layer Sequence | Material | Thickness (nm) |
| 1 | H | 9.59 |
| 2 | L | 37.89 |
| 3 | H | 100.35 |
| 4 | L | 192.08 |
| 5 | H | 17.59 |
| 6 | L | 215.28 |
| 7 | H | 21.31 |
| 8 | L | 203.09 |
| 9 | H | 46.69 |
| 10 | L | 34.27 |
| 11 | H | 22.66 |
| 12 | L | 80.73 |
| 13 | H | 113.15 |
| 14 | L | 44.64 |
| 15 | H | 120.05 |
| 16 | L | 41.82 |
| 17 | H | 120.62 |
| 18 | L | 43.13 |
| 19 | H | 119.72 |
| 20 | L | 43.07 |
| 21 | H | 121.02 |
| 22 | L | 38.24 |
| 23 | H | 124.47 |
| 24 | L | 32.66 |
| 25 | H | 124.85 |
| 26 | L | 27.84 |
| 27 | H | 104.15 |
| 28 | L | 68.59 |

TABLE 3D

Details of each layer of the multi-layer coating membrane
on the image-side surface of Example 1

| Layer Sequence | Material | Thickness (nm) |
|---|---|---|
| 1 | H | 11.87 |
| 2 | L | 38.64 |
| 3 | H | 113.57 |
| 4 | L | 184.37 |
| 5 | H | 109.47 |
| 6 | L | 186.21 |
| 7 | H | 104.88 |
| 8 | L | 169.30 |
| 9 | H | 96.18 |
| 10 | L | 175.71 |
| 11 | H | 107.74 |
| 12 | L | 180.71 |
| 13 | H | 97.49 |
| 14 | L | 163.69 |
| 15 | H | 100.86 |
| 16 | L | 182.70 |
| 17 | H | 102.55 |
| 18 | L | 161.25 |
| 19 | H | 83.87 |
| 20 | L | 148.34 |
| 21 | H | 79.98 |
| 22 | L | 144.71 |
| 23 | H | 78.93 |
| 24 | L | 142.86 |
| 25 | H | 79.24 |
| 26 | L | 143.52 |
| 27 | H | 79.12 |
| 28 | L | 142.13 |
| 29 | H | 79.37 |
| 30 | L | 143.72 |
| 31 | H | 79.68 |
| 32 | L | 144.92 |
| 33 | H | 81.90 |
| 34 | L | 149.35 |
| 35 | H | 81.76 |
| 36 | L | 71.69 |

Table 3E shows the values of tTk, LtTk, HtTk, LtTk/HtTk, otTk, itTk, otTk/itTk, NH and NL of the multi-layer coating membrane of Example 1, wherein otTk is a total thickness of the multi-layer coating membrane on the object-side surface of the optical element, and itTk is a total thickness of the multi-layer coating membrane on the image-side surface of the optical element.

TABLE 3E

| tTk (nm) | 6511.83 | itTk (nm) | 4242.28 |
|---|---|---|---|
| LtTk (nm) | 3777.15 | otTk/itTk | 0.53 |
| HtTk (nm) | 2734.68 | NH | 2.45 |
| LtTk/HtTk | 1.38 | NL | 1.48 |
| otTk (nm) | 2269.55 | | |

The total number of layers of the multi-layer coating membrane of Example 1 is 64, which is not up to the effective range of 65 layers to 200 layers and is without the dual-bandpass filtering function and is without the dual-bandpass filtering function. However, in Example 1, a ratio of the total thickness of the low refractive index layer and the total thickness of the high refractive index layer LtTk/HtTk=1.38, which falls within the effective range of 1.0 to 1.5 and has the function of reducing the difference between transmittance at 0 degrees and non-0 degrees of the long-wavelength visible light.

Example 2

The optical lens assembly of Example 2 includes at least one optical element, the at least one optical element includes a multi-layer coating membrane, and the multi-layer coating membrane is formed by alternately stacking high refractive index layers and low refractive index layers.

Figure 4:
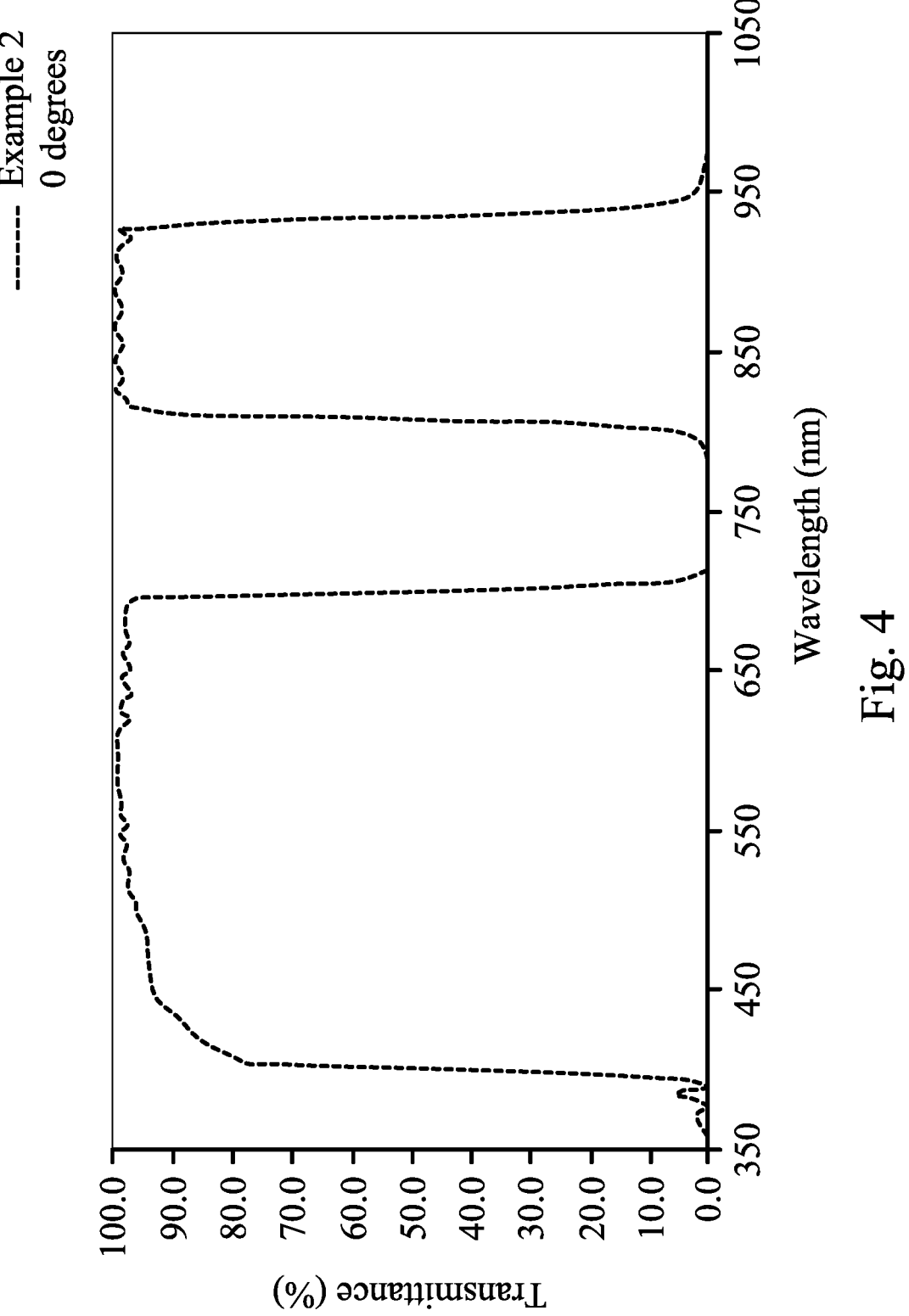
FIG. 4 is a relationship diagram between transmittances and wavelengths of an optical element including a multi-layer coating membrane of an optical lens assembly according to Example 2 of the present disclosure.

FIG. 4 is a relationship diagram between transmittances and wavelengths of an optical element including a multi-layer coating membrane of an optical lens assembly according to Example 2, and Table 4A shows the values of transmittance in a wavelength range of 350 nm-1050 nm of the optical element including the multi-layer coating membrane of Example 2, wherein the incidence angle of the light entering the optical element including the multi-layer coating membrane of Example 2 is 0 degrees.

TABLE 4A

Transmittance of Example 2 (%)

| Wavelength (nm) | 0 degrees |
|---|---|
| 350 | 0.00 |
| 355 | 0.00 |
| 360 | 0.02 |
| 365 | 0.19 |
| 370 | 2.40 |
| 375 | 1.01 |
| 380 | 0.22 |
| 385 | 5.48 |
| 390 | 0.60 |
| 395 | 2.48 |
| 400 | 32.66 |
| 405 | 77.49 |
| 410 | 80.78 |
| 415 | 83.24 |
| 420 | 85.47 |
| 425 | 86.97 |
| 430 | 88.05 |
| 435 | 89.75 |
| 440 | 91.76 |
| 445 | 92.84 |
| 450 | 93.24 |
| 455 | 93.60 |
| 460 | 93.92 |
| 465 | 93.92 |
| 470 | 94.05 |
| 475 | 94.07 |
| 480 | 94.25 |
| 485 | 94.13 |
| 490 | 95.18 |
| 495 | 95.32 |
| 500 | 96.20 |
| 505 | 96.05 |
| 510 | 97.09 |
| 515 | 97.01 |
| 520 | 97.50 |
| 525 | 97.19 |
| 530 | 98.18 |
| 535 | 98.27 |
| 540 | 97.74 |
| 545 | 98.16 |
| 550 | 98.68 |
| 555 | 97.57 |
| 560 | 99.05 |
| 565 | 98.41 |
| 570 | 98.56 |
| 575 | 99.57 |
| 580 | 98.87 |
| 585 | 99.45 |
| 590 | 99.29 |
| 595 | 99.30 |
| 600 | 99.71 |
| 605 | 99.01 |
| 610 | 99.32 |
| 615 | 98.47 |
| 620 | 97.23 |
| 625 | 98.74 |
| 630 | 98.76 |
| 635 | 96.80 |
| 640 | 97.80 |
| 645 | 98.78 |

TABLE 4A-continued

| Transmittance of Example 2 (%) | |
| --- | --- |
| Wavelength (nm) | 0 degrees |
| 650 | 97.12 |
| 655 | 97.39 |
| 660 | 98.64 |
| 665 | 97.36 |
| 670 | 97.10 |
| 675 | 98.23 |
| 680 | 97.85 |
| 685 | 98.21 |
| 690 | 97.39 |
| 695 | 97.59 |
| 700 | 42.02 |
| 705 | 5.61 |
| 710 | 1.06 |
| 715 | 0.30 |
| 720 | 0.11 |
| 725 | 0.05 |
| 730 | 0.03 |
| 735 | 0.02 |
| 740 | 0.01 |
| 745 | 0.01 |
| 750 | 0.01 |
| 755 | 0.01 |
| 760 | 0.01 |
| 765 | 0.02 |
| 770 | 0.02 |
| 775 | 0.04 |
| 780 | 0.06 |
| 785 | 0.13 |
| 790 | 0.33 |
| 795 | 1.01 |
| 800 | 4.08 |
| 805 | 22.00 |
| 810 | 86.69 |
| 815 | 98.07 |
| 820 | 97.37 |
| 825 | 99.97 |
| 830 | 98.74 |
| 835 | 98.08 |
| 840 | 99.40 |
| 845 | 99.91 |
| 850 | 98.88 |
| 855 | 98.37 |
| 860 | 99.21 |
| 865 | 99.96 |
| 870 | 99.41 |
| 875 | 98.49 |
| 880 | 98.67 |
| 885 | 99.70 |
| 890 | 99.87 |
| 895 | 98.71 |
| 900 | 97.97 |
| 905 | 98.99 |
| 910 | 99.99 |
| 915 | 98.27 |
| 920 | 96.54 |
| 925 | 99.70 |
| 930 | 85.37 |
| 935 | 34.99 |
| 940 | 10.50 |
| 945 | 3.60 |
| 950 | 1.48 |
| 955 | 0.71 |
| 960 | 0.38 |
| 965 | 0.23 |
| 970 | 0.15 |
| 975 | 0.10 |
| 980 | 0.08 |
| 985 | 0.06 |
| 990 | 0.05 |
| 995 | 0.05 |
| 1000 | 0.04 |
| 1005 | 0.04 |
| 1010 | 0.04 |
| 1015 | 0.05 |
| 1020 | 0.05 |
| 1025 | 0.06 |

TABLE 4A-continued

| Transmittance of Example 2 (%) | |
| --- | --- |
| Wavelength (nm) | 0 degrees |
| 1030 | 0.08 |
| 1035 | 0.10 |
| 1040 | 0.13 |
| 1045 | 0.18 |
| 1050 | 0.25 |

Table 4B shows the values of T3540, T4050, T4563, T5060, T6065, T7076, T7080, T70105, T8387, T45, T55, T65 and T85 of the optical element including the multi-layer coating membrane of Example 2 at the incidence angle of 0 degrees.

TABLE 4B

| | 0 degrees |
| --- | --- |
| T3540 (%) | 4.10 |
| T4050 (%) | 87.95 |
| T4563 (%) | 97.16 |
| T5060 (%) | 98.18 |
| T6065 (%) | 98.34 |
| T7076 (%) | 3.79 |
| T7080 (%) | 2.62 |
| T70105 (%) | 36.29 |
| T8387 (%) | 99.10 |
| T45 (%) | 93.24 |
| T55 (%) | 98.68 |
| T65 (%) | 97.12 |
| T85 (%) | 98.88 |

The multi-layer coating membrane of Example 2 can be disposed on the object-side surface or the image-side surface of the optical element, and a total number of layers of the multi-layer coating membrane tLs=100. The details of each layer of the multi-layer coating membrane of Example 2 are shown in Table 4C.

TABLE 4C

| Layer Sequence | Material | Thickness (nm) |
| --- | --- | --- |
| 1 | H | 15.30 |
| 2 | L | 32.31 |
| 3 | H | 37.11 |
| 4 | L | 8.66 |
| 5 | H | 92.21 |
| 6 | L | 13.76 |
| 7 | H | 38.73 |
| 8 | L | 19.61 |
| 9 | H | 135.22 |
| 10 | L | 21.77 |
| 11 | H | 36.63 |
| 12 | L | 16.47 |
| 13 | H | 245.70 |
| 14 | L | 7.79 |
| 15 | H | 28.67 |
| 16 | L | 7.35 |
| 17 | H | 117.74 |
| 18 | L | 31.57 |
| 19 | H | 26.00 |
| 20 | L | 35.85 |
| 21 | H | 108.27 |
| 22 | L | 27.00 |
| 23 | H | 11.69 |
| 24 | L | 26.37 |
| 25 | H | 11.40 |
| 26 | L | 31.98 |
| 27 | H | 123.78 |
| 28 | L | 16.75 |
| 29 | H | 139.01 |
| 30 | L | 18.36 |

TABLE 4C-continued

| Layer Sequence | Material | Thickness (nm) |
|---|---|---|
| 31 | H | 133.03 |
| 32 | L | 36.65 |
| 33 | H | 30.01 |
| 34 | L | 16.07 |
| 35 | H | 79.71 |
| 36 | L | 162.09 |
| 37 | H | 84.38 |
| 38 | L | 33.33 |
| 39 | H | 8.12 |
| 40 | L | 116.42 |
| 41 | H | 27.17 |
| 42 | L | 30.49 |
| 43 | H | 46.81 |
| 44 | L | 13.65 |
| 45 | H | 80.89 |
| 46 | L | 32.03 |
| 47 | H | 8.23 |
| 48 | L | 119.56 |
| 49 | H | 93.71 |
| 50 | L | 144.29 |
| 51 | H | 97.00 |
| 52 | L | 124.93 |
| 53 | H | 4.35 |
| 54 | L | 60.29 |
| 55 | H | 27.15 |
| 56 | L | 34.89 |
| 57 | H | 118.12 |
| 58 | L | 155.26 |
| 59 | H | 87.85 |
| 60 | L | 149.85 |
| 61 | H | 88.63 |
| 62 | L | 14.39 |
| 63 | H | 7.07 |
| 64 | L | 190.95 |
| 65 | H | 12.55 |
| 66 | L | 52.66 |
| 67 | H | 23.21 |
| 68 | L | 8.20 |
| 69 | H | 83.86 |
| 70 | L | 154.50 |
| 71 | H | 88.59 |
| 72 | L | 155.09 |
| 73 | H | 102.85 |
| 74 | L | 19.95 |
| 75 | H | 12.44 |
| 76 | L | 37.23 |
| 77 | H | 11.54 |
| 78 | L | 197.96 |
| 79 | H | 22.68 |
| 80 | L | 5.97 |
| 81 | H | 75.51 |
| 82 | L | 175.23 |
| 83 | H | 19.07 |
| 84 | L | 31.73 |
| 85 | H | 13.25 |
| 86 | L | 183.09 |
| 87 | H | 11.85 |
| 88 | L | 37.60 |
| 89 | H | 8.01 |
| 90 | L | 194.83 |
| 91 | H | 9.99 |
| 92 | L | 42.22 |
| 93 | H | 4.35 |
| 94 | L | 194.62 |
| 95 | H | 4.35 |
| 96 | L | 153.11 |
| 97 | H | 13.61 |
| 98 | L | 45.64 |
| 99 | H | 27.04 |
| 100 | L | 100.27 |

Table 4D shows the values of tTk, LtTk, HtTk, LtTk/ HtTk, NH and NL of the multi-layer coating membrane of Example 2.

TABLE 4D

| tTk (nm) | 6275.08 | LtTk/HtTk | 1.29 |
|---|---|---|---|
| LtTk (nm) | 3540.64 | NH | 2.45 |
| HtTk (nm) | 2734.44 | NL | 1.48 |

The total number of layers of the multi-layer coating membrane of Example 2 is 100, which falls within the effective range of 65 layers to 200 layers and is with the dual-bandpass filtering function. Furthermore, under the premise of having the dual-bandpass filtering function, the total number of layers of the multi-layer coating membrane of Example 2 is less than that of Comparative example 2. Thus, it is favorable for reducing the deformation of the plastic optical lens element during coating.

Example 3

The optical lens assembly of Example 3 includes at least one optical element, the at least one optical element includes a multi-layer coating membrane, and the multi-layer coating membrane is formed by alternately stacking high refractive index layers and low refractive index layers.

Figure 5:
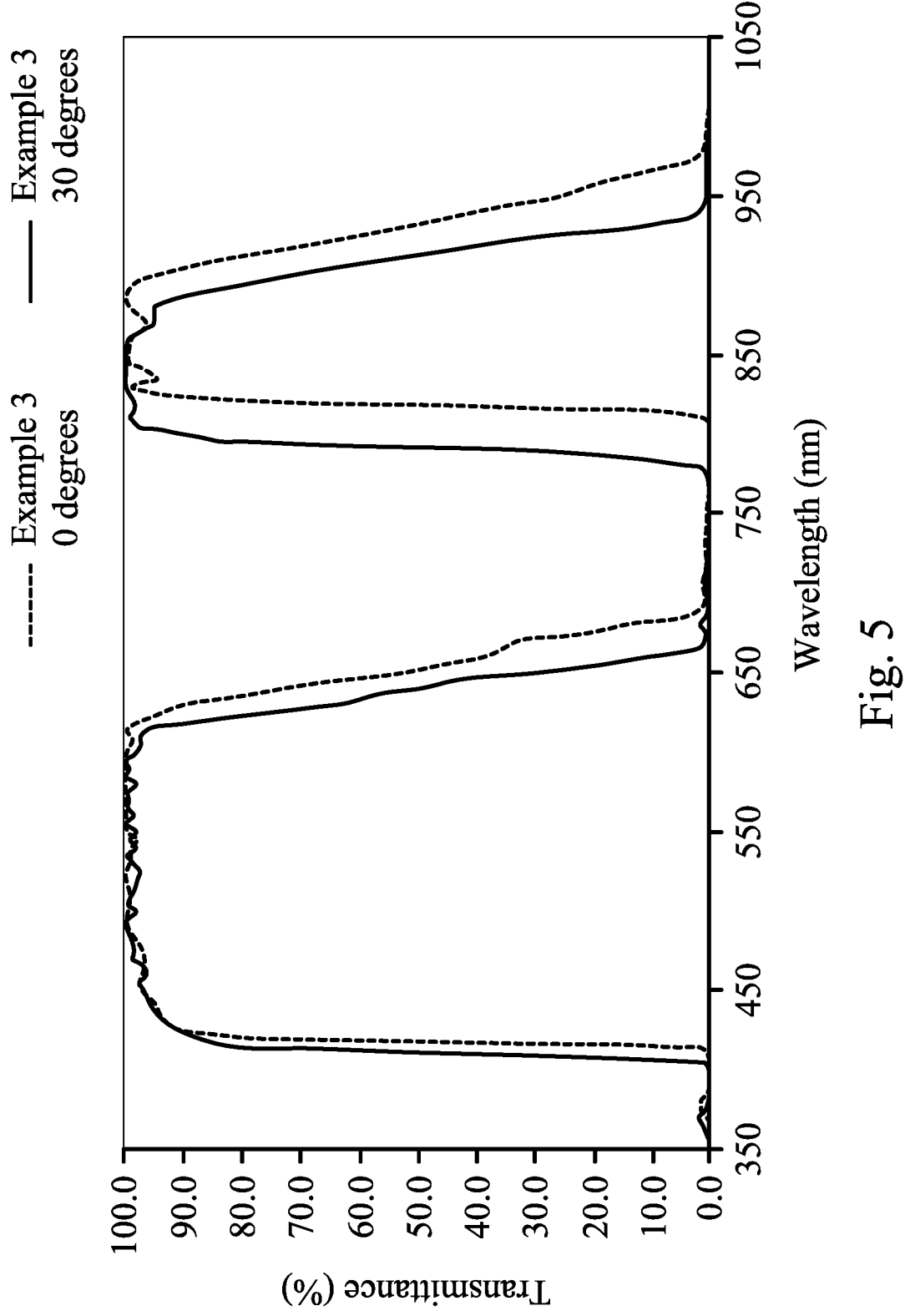
FIG. 5 is a relationship diagram between transmittances and wavelengths of an optical element including a multi-layer coating membrane of an optical lens assembly according to Example 3 of the present disclosure.

FIG. 5 is a relationship diagram between transmittances and wavelengths of an optical element including a multi-layer coating membrane of an optical lens assembly according to Example 3, and Table 5A shows the values of transmittance in a wavelength range of 350 nm-1050 nm of the optical element including the multi-layer coating membrane of Example 3, wherein the incidence angles of the light entering the optical element including the multi-layer coating membrane of Example 3 are 0 degrees and 30 degrees, respectively.

TABLE 5A

| Transmittance of Example 3 (%) | | |
|---|---|---|
| Wavelength (nm) | 0 degrees | 30 degrees |
| 350 | 0.00 | 0.00 |
| 355 | 0.00 | 0.00 |
| 360 | 0.00 | 0.15 |
| 365 | 0.00 | 1.23 |
| 370 | 0.00 | 1.82 |
| 375 | 1.43 | 0.11 |
| 380 | 1.78 | 0.31 |
| 385 | 0.02 | 0.00 |
| 390 | 0.02 | 0.01 |
| 395 | 0.00 | 0.02 |
| 400 | 0.01 | 0.04 |
| 405 | 0.06 | 0.63 |
| 410 | 0.30 | 34.91 |
| 415 | 0.27 | 80.70 |
| 420 | 77.91 | 87.40 |
| 425 | 89.86 | 90.55 |
| 430 | 92.57 | 92.66 |
| 435 | 93.96 | 94.13 |
| 440 | 94.66 | 95.24 |
| 445 | 96.09 | 95.75 |
| 450 | 96.81 | 96.70 |
| 455 | 97.05 | 97.17 |
| 460 | 96.57 | 96.02 |
| 465 | 97.11 | 96.42 |
| 470 | 98.08 | 98.43 |
| 475 | 96.46 | 98.09 |
| 480 | 97.80 | 98.44 |
| 485 | 99.07 | 98.98 |
| 490 | 99.18 | 99.29 |
| 495 | 98.78 | 99.34 |
| 500 | 98.87 | 98.01 |
| 505 | 99.59 | 99.37 |
| 510 | 99.15 | 98.59 |
| 515 | 99.03 | 98.31 |

TABLE 5A-continued

| Transmittance of Example 3 (%) | | |
| --- | --- | --- |
| Wavelength (nm) | 0 degrees | 30 degrees |
| 520 | 99.68 | 97.68 |
| 525 | 99.73 | 97.34 |
| 530 | 99.30 | 98.19 |
| 535 | 99.75 | 99.57 |
| 540 | 98.54 | 97.93 |
| 545 | 97.56 | 98.92 |
| 550 | 99.74 | 97.81 |
| 555 | 98.05 | 99.61 |
| 560 | 99.74 | 98.25 |
| 565 | 99.86 | 99.44 |
| 570 | 99.67 | 99.08 |
| 575 | 99.64 | 99.54 |
| 580 | 99.54 | 97.73 |
| 585 | 99.68 | 99.79 |
| 590 | 99.97 | 99.03 |
| 595 | 99.75 | 99.76 |
| 600 | 99.31 | 97.69 |
| 605 | 98.61 | 97.09 |
| 610 | 98.37 | 97.36 |
| 615 | 99.80 | 95.63 |
| 620 | 96.24 | 88.06 |
| 625 | 93.35 | 73.83 |
| 630 | 90.09 | 63.14 |
| 635 | 80.65 | 58.17 |
| 640 | 72.26 | 50.01 |
| 645 | 63.04 | 43.29 |
| 650 | 52.34 | 30.03 |
| 655 | 45.97 | 19.66 |
| 660 | 39.04 | 9.78 |
| 665 | 35.39 | 1.80 |
| 670 | 32.61 | 0.62 |
| 675 | 20.72 | 0.51 |
| 680 | 14.37 | 1.35 |
| 685 | 4.29 | 0.58 |
| 690 | 0.98 | 0.12 |
| 695 | 0.44 | 0.07 |
| 700 | 0.43 | 0.09 |
| 705 | 1.13 | 0.50 |
| 710 | 0.35 | 0.58 |
| 715 | 0.08 | 0.11 |
| 720 | 0.04 | 0.12 |
| 725 | 0.04 | 0.23 |
| 730 | 0.09 | 0.04 |
| 735 | 1.14 | 0.01 |
| 740 | 0.30 | 0.01 |
| 745 | 0.15 | 0.00 |
| 750 | 0.34 | 0.00 |
| 755 | 0.06 | 0.01 |
| 760 | 0.01 | 0.01 |
| 765 | 0.00 | 0.02 |
| 770 | 0.00 | 0.06 |
| 775 | 0.00 | 0.23 |
| 780 | 0.00 | 1.55 |
| 785 | 0.00 | 14.90 |
| 790 | 0.01 | 31.83 |
| 795 | 0.01 | 82.84 |
| 800 | 0.03 | 89.38 |
| 805 | 0.12 | 97.50 |
| 810 | 0.68 | 98.95 |
| 815 | 6.92 | 98.24 |
| 820 | 74.45 | 98.30 |
| 825 | 93.39 | 99.12 |
| 830 | 99.82 | 99.86 |
| 835 | 94.25 | 99.82 |
| 840 | 96.27 | 99.54 |
| 845 | 99.67 | 99.38 |
| 850 | 98.88 | 99.52 |
| 855 | 99.00 | 99.78 |
| 860 | 99.11 | 98.97 |
| 865 | 97.34 | 96.69 |
| 870 | 96.48 | 94.81 |
| 875 | 97.78 | 94.70 |
| 880 | 99.22 | 94.76 |
| 885 | 99.66 | 91.92 |
| 890 | 99.57 | 85.65 |
| 895 | 98.08 | 78.21 |

TABLE 5A-continued

| Transmittance of Example 3 (%) | | |
| --- | --- | --- |
| Wavelength (nm) | 0 degrees | 30 degrees |
| 900 | 93.95 | 71.15 |
| 905 | 88.15 | 63.57 |
| 910 | 82.20 | 54.50 |
| 915 | 75.77 | 45.34 |
| 920 | 68.15 | 38.00 |
| 925 | 60.14 | 28.92 |
| 930 | 52.95 | 13.65 |
| 935 | 46.36 | 4.45 |
| 940 | 39.17 | 1.54 |
| 945 | 31.47 | 0.64 |
| 950 | 25.03 | 0.32 |
| 955 | 20.93 | 0.19 |
| 960 | 17.60 | 0.14 |
| 965 | 11.02 | 0.11 |
| 970 | 4.42 | 0.10 |
| 975 | 1.62 | 0.11 |
| 980 | 0.67 | 0.11 |
| 985 | 0.33 | 0.10 |
| 990 | 0.19 | 0.07 |
| 995 | 0.12 | 0.04 |
| 1000 | 0.09 | 0.02 |
| 1005 | 0.08 | 0.01 |
| 1010 | 0.07 | 0.01 |
| 1015 | 0.08 | 0.01 |
| 1020 | 0.09 | 0.01 |
| 1025 | 0.08 | 0.01 |
| 1030 | 0.05 | 0.01 |
| 1035 | 0.03 | 0.01 |
| 1040 | 0.02 | 0.01 |
| 1045 | 0.01 | 0.01 |
| 1050 | 0.01 | 0.01 |

Table 5B shows the values of Wt50v, |dWt50v|, Wt50i, |dWt50i|, Wt50avg, RdTv, RdTi, T3540, T4050, T4563, T5060, T6065, T7076, T7080, T70105, T8387, T45, T55, T65 and T85 of the optical element including the multi-layer coating membrane of Example 3 at the incidence angles of 0 degrees and 30 degrees.

TABLE 5B

| | 0 degrees | 30 degrees |
| --- | --- | --- |
| Wt50v (nm) | 651.80 | 640.00 |
| |dWt50v| (nm) | | 11.80 |
| Wt50i (nm) | 932.24 | 912.46 |
| |dWt50i| (nm) | | 19.78 |
| Wt50avg (nm) | | 645.90 |
| RdTv | | 0.27 |
| RdTi | | 0.26 |
| T3540 (%) | 0.30 | 0.34 |
| T4050 (%) | 77.21 | 83.28 |
| T4563 (%) | 98.37 | 96.37 |
| T5060 (%) | 99.34 | 98.65 |
| T6065 (%) | 85.82 | 72.21 |
| T7076 (%) | 0.32 | 0.13 |
| T7080 (%) | 0.20 | 10.60 |
| T70105 (%) | 32.05 | 33.40 |
| T8387 (%) | 97.87 | 98.71 |
| T45 (%) | 96.81 | 96.70 |
| T55 (%) | 99.74 | 97.81 |
| T65 (%) | 52.34 | 30.03 |
| T85 (%) | 98.88 | 99.52 |

The multi-layer coating membrane of Example 3 can be disposed on the object-side surface or the image-side surface of the optical element, and a total number of layers of the multi-layer coating membrane tLs=128. The details of each layer of the multi-layer coating membrane of Example 3 are shown in Table 5C.

TABLE 5C

| Layer Sequence | Material | Thickness (nm) |
|---|---|---|
| 1 | H | 9.37 |
| 2 | L | 41.49 |
| 3 | H | 6.48 |
| 4 | L | 29.58 |
| 5 | H | 9.54 |
| 6 | L | 233.37 |
| 7 | H | 6.16 |
| 8 | L | 227.69 |
| 9 | H | 5.77 |
| 10 | L | 209.81 |
| 11 | H | 18.03 |
| 12 | L | 47.47 |
| 13 | H | 10.70 |
| 14 | L | 138.61 |
| 15 | H | 30.99 |
| 16 | L | 4.87 |
| 17 | H | 73.39 |
| 18 | L | 32.75 |
| 19 | H | 122.68 |
| 20 | L | 37.51 |
| 21 | H | 105.86 |
| 22 | L | 40.45 |
| 23 | H | 6.51 |
| 24 | L | 56.59 |
| 25 | H | 95.14 |
| 26 | L | 27.81 |
| 27 | H | 7.49 |
| 28 | L | 47.54 |
| 29 | H | 108.80 |
| 30 | L | 48.46 |
| 31 | H | 110.14 |
| 32 | L | 46.84 |
| 33 | H | 9.21 |
| 34 | L | 23.55 |
| 35 | H | 106.13 |
| 36 | L | 44.83 |
| 37 | H | 29.48 |
| 38 | L | 5.39 |
| 39 | H | 74.34 |
| 40 | L | 172.84 |
| 41 | H | 12.55 |
| 42 | L | 67.79 |
| 43 | H | 6.81 |
| 44 | L | 94.52 |
| 45 | H | 107.11 |
| 46 | L | 58.74 |
| 47 | H | 18.61 |
| 48 | L | 27.21 |
| 49 | H | 99.95 |
| 50 | L | 18.66 |
| 51 | H | 130.75 |
| 52 | L | 25.26 |
| 53 | H | 115.96 |
| 54 | L | 181.84 |
| 55 | H | 10.23 |
| 56 | L | 26.19 |
| 57 | H | 21.18 |
| 58 | L | 46.04 |
| 59 | H | 14.48 |
| 60 | L | 252.94 |
| 61 | H | 4.62 |
| 62 | L | 105.10 |
| 63 | H | 5.28 |
| 64 | L | 234.74 |
| 65 | H | 19.79 |
| 66 | L | 11.33 |
| 67 | H | 79.49 |
| 68 | L | 177.02 |
| 69 | H | 123.23 |
| 70 | L | 12.79 |
| 71 | H | 229.19 |
| 72 | L | 40.05 |
| 73 | H | 19.58 |
| 74 | L | 50.84 |
| 75 | H | 104.32 |
| 76 | L | 170.38 |
| 77 | H | 114.20 |
| 78 | L | 35.58 |

TABLE 5C-continued

| Layer Sequence | Material | Thickness (nm) |
|---|---|---|
| 79 | H | 30.69 |
| 80 | L | 22.97 |
| 81 | H | 179.84 |
| 82 | L | 17.87 |
| 83 | H | 34.25 |
| 84 | L | 29.79 |
| 85 | H | 116.68 |
| 86 | L | 173.06 |
| 87 | H | 102.47 |
| 88 | L | 34.45 |
| 89 | H | 12.83 |
| 90 | L | 53.21 |
| 91 | H | 17.35 |
| 92 | L | 28.60 |
| 93 | H | 120.33 |
| 94 | L | 27.11 |
| 95 | H | 17.29 |
| 96 | L | 74.57 |
| 97 | H | 13.70 |
| 98 | L | 44.16 |
| 99 | H | 118.63 |
| 100 | L | 34.25 |
| 101 | H | 1.00 |
| 102 | L | 30.47 |
| 103 | H | 4.85 |
| 104 | L | 99.06 |
| 105 | H | 104.69 |
| 106 | L | 121.50 |
| 107 | H | 6.22 |
| 108 | L | 43.21 |
| 109 | H | 138.39 |
| 110 | L | 17.14 |
| 111 | H | 32.19 |
| 112 | L | 36.32 |
| 113 | H | 21.78 |
| 114 | L | 30.92 |
| 115 | H | 105.76 |
| 116 | L | 165.26 |
| 117 | H | 16.00 |
| 118 | L | 4.22 |
| 119 | H | 81.33 |
| 120 | L | 32.80 |
| 121 | H | 12.97 |
| 122 | L | 159.13 |
| 123 | H | 7.82 |
| 124 | L | 44.97 |
| 125 | H | 43.56 |
| 126 | L | 7.59 |
| 127 | H | 51.62 |
| 128 | L | 90.42 |

Table 5D shows the values of tTk, LtTk, HtTk, LtTk/HtTk, NH and NL of the multi-layer coating membrane of Example 3.

TABLE 5D

| | | | |
|---|---|---|---|
| tTk (nm) | 8153.30 | LtTk/HtTk | 1.28 |
| LtTk (nm) | 4577.52 | NH | 2.45 |
| HtTk (nm) | 3575.78 | NL | 1.48 |

The total number of layers of the multi-layer coating membrane of Example 3 is 128, which falls within the effective range of 65 layers to 200 layers and is with the dual-bandpass filtering function. Further, a ratio of the total thickness of the low refractive index layer and the total thickness of the high refractive index layer LtTk/HtTk=1.28, which falls within the effective range of 1.0 to 1.5 and has the function of reducing the difference between transmittance at 0 degrees and non-0 degrees of the long-wavelength visible light.

Example 4

The optical lens assembly of Example 4 includes at least one optical element, the at least one optical element includes a multi-layer coating membrane, and the multi-layer coating membrane is formed by alternately stacking high refractive index layers and low refractive index layers.

Figure 6:
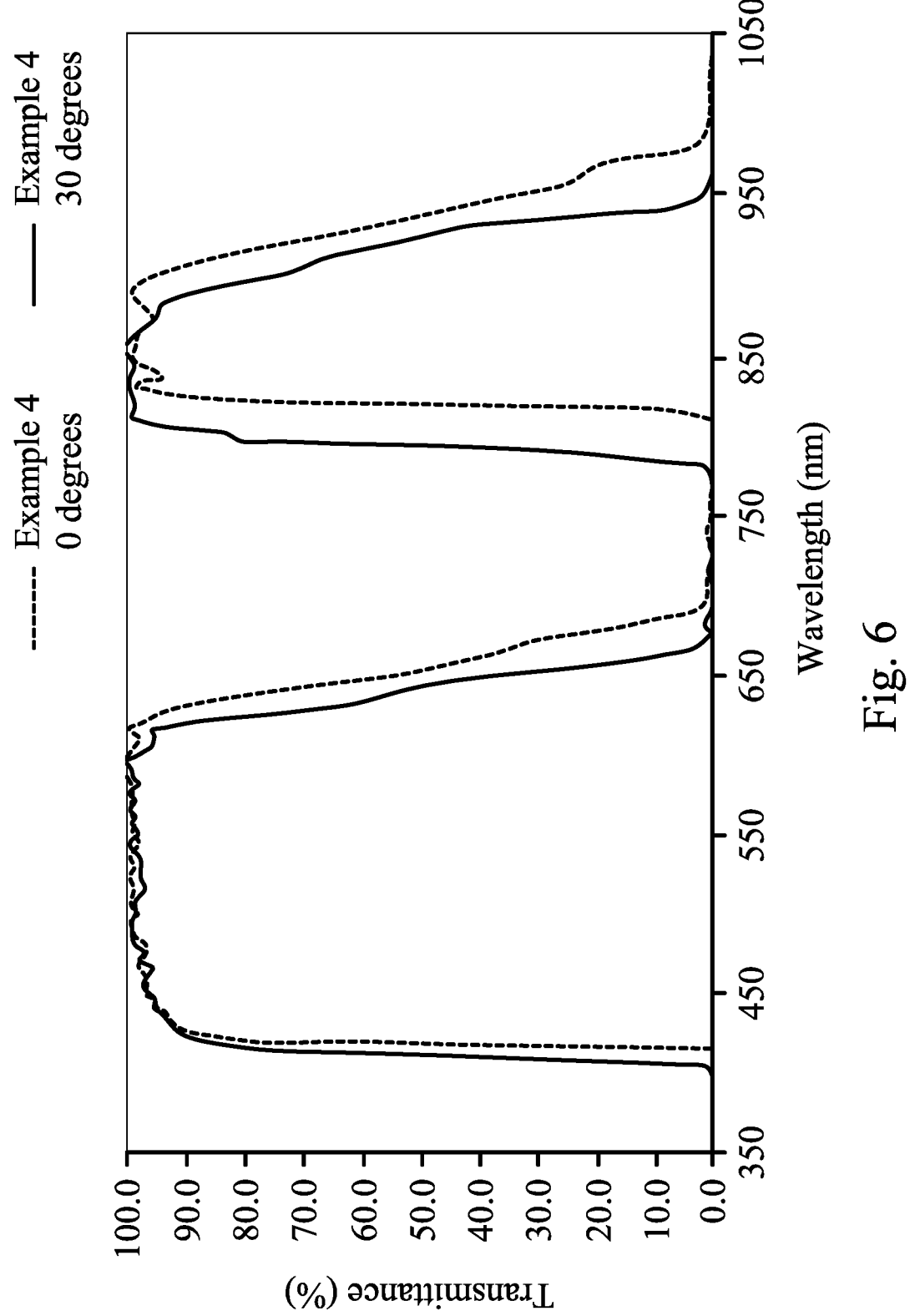
FIG. 6 is a relationship diagram between transmittances and wavelengths of an optical element including a multi-layer coating membrane of an optical lens assembly according to Example 4 of the present disclosure.

FIG. 6 is a relationship diagram between transmittances and wavelengths of an optical element including a multi-layer coating membrane of an optical lens assembly according to Example 4, and Table 6A shows the values of transmittance in a wavelength range of 350 nm-1050 nm of the optical element including the multi-layer coating membrane of Example 4, wherein the incidence angles of the light entering the optical element including the multi-layer coating membrane of Example 4 are 0 degrees and 30 degrees, respectively.

TABLE 6A

| Transmittance of Example 4 (%) | | |
| --- | --- | --- |
| Wavelength (nm) | 0 degrees | 30 degrees |
| 350 | 0.01 | 0.00 |
| 355 | 0.00 | 0.00 |
| 360 | 0.00 | 0.06 |
| 365 | 0.00 | 0.13 |
| 370 | 0.06 | 0.36 |
| 375 | 0.13 | 0.01 |
| 380 | 0.27 | 0.00 |
| 385 | 0.00 | 0.00 |
| 390 | 0.00 | 0.00 |
| 395 | 0.00 | 0.00 |
| 400 | 0.00 | 0.09 |
| 405 | 0.00 | 1.24 |
| 410 | 0.15 | 46.07 |
| 415 | 1.30 | 79.28 |
| 420 | 77.74 | 86.96 |
| 425 | 89.91 | 91.02 |
| 430 | 91.82 | 92.58 |
| 435 | 93.86 | 93.82 |
| 440 | 93.77 | 95.22 |
| 445 | 96.02 | 95.12 |
| 450 | 96.87 | 96.52 |
| 455 | 96.53 | 97.22 |
| 460 | 96.69 | 96.61 |
| 465 | 97.88 | 95.59 |
| 470 | 98.41 | 97.72 |
| 475 | 97.13 | 97.09 |
| 480 | 96.37 | 98.85 |
| 485 | 98.98 | 99.09 |
| 490 | 99.36 | 99.17 |
| 495 | 98.91 | 99.19 |
| 500 | 99.50 | 98.54 |
| 505 | 99.13 | 98.83 |
| 510 | 99.15 | 98.39 |
| 515 | 98.78 | 97.01 |
| 520 | 99.38 | 97.55 |
| 525 | 99.78 | 97.60 |
| 530 | 98.50 | 97.56 |
| 535 | 99.65 | 97.95 |
| 540 | 99.45 | 99.28 |
| 545 | 97.82 | 99.30 |
| 550 | 99.49 | 98.16 |
| 555 | 98.17 | 99.12 |
| 560 | 98.87 | 98.75 |
| 565 | 99.74 | 99.57 |
| 570 | 98.95 | 98.64 |
| 575 | 98.53 | 99.79 |
| 580 | 99.98 | 97.99 |
| 585 | 99.91 | 99.08 |
| 590 | 99.92 | 99.50 |
| 595 | 99.57 | 99.86 |
| 600 | 99.37 | 97.15 |
| 605 | 98.43 | 95.30 |
| 610 | 97.46 | 95.44 |

TABLE 6A-continued

| Transmittance of Example 4 (%) | | |
| --- | --- | --- |
| Wavelength (nm) | 0 degrees | 30 degrees |
| 615 | 99.87 | 95.62 |
| 620 | 96.93 | 86.89 |
| 625 | 93.76 | 74.00 |
| 630 | 90.69 | 63.44 |
| 635 | 82.07 | 56.98 |
| 640 | 71.13 | 52.34 |
| 645 | 60.87 | 43.59 |
| 650 | 52.09 | 32.04 |
| 655 | 45.41 | 18.31 |
| 660 | 39.96 | 10.05 |
| 665 | 34.68 | 3.54 |
| 670 | 30.71 | 1.13 |
| 675 | 21.92 | 0.69 |
| 680 | 13.56 | 1.15 |
| 685 | 6.80 | 1.04 |
| 690 | 2.04 | 0.15 |
| 695 | 0.82 | 0.06 |
| 700 | 0.66 | 0.05 |
| 705 | 1.38 | 0.08 |
| 710 | 0.50 | 0.54 |
| 715 | 0.09 | 0.50 |
| 720 | 0.04 | 0.10 |
| 725 | 0.03 | 0.10 |
| 730 | 0.03 | 0.31 |
| 735 | 0.09 | 0.13 |
| 740 | 1.58 | 0.03 |
| 745 | 0.33 | 0.01 |
| 750 | 0.16 | 0.01 |
| 755 | 0.41 | 0.01 |
| 760 | 0.18 | 0.02 |
| 765 | 0.03 | 0.03 |
| 770 | 0.01 | 0.08 |
| 775 | 0.01 | 0.29 |
| 780 | 0.01 | 1.75 |
| 785 | 0.01 | 14.66 |
| 790 | 0.01 | 30.53 |
| 795 | 0.02 | 80.63 |
| 800 | 0.05 | 83.34 |
| 805 | 0.18 | 95.45 |
| 810 | 0.93 | 99.45 |
| 815 | 8.68 | 98.66 |
| 820 | 79.84 | 98.62 |
| 825 | 93.49 | 99.32 |
| 830 | 99.93 | 99.94 |
| 835 | 94.26 | 99.56 |
| 840 | 95.40 | 99.15 |
| 845 | 99.60 | 99.49 |
| 850 | 98.78 | 99.93 |
| 855 | 98.40 | 99.84 |
| 860 | 99.33 | 99.01 |
| 865 | 97.84 | 97.37 |
| 870 | 95.57 | 95.60 |
| 875 | 95.76 | 94.71 |
| 880 | 97.72 | 94.17 |
| 885 | 99.10 | 91.71 |
| 890 | 99.18 | 86.04 |
| 895 | 97.82 | 78.81 |
| 900 | 94.38 | 72.73 |
| 905 | 89.17 | 68.94 |
| 910 | 83.52 | 65.74 |
| 915 | 77.69 | 60.11 |
| 920 | 70.99 | 52.76 |
| 925 | 63.61 | 47.77 |
| 930 | 56.83 | 42.53 |
| 935 | 51.25 | 23.79 |
| 940 | 45.82 | 8.07 |
| 945 | 39.04 | 2.81 |
| 950 | 31.44 | 1.21 |
| 955 | 25.41 | 0.64 |
| 960 | 22.38 | 0.41 |
| 965 | 21.52 | 0.31 |
| 970 | 16.77 | 0.28 |
| 975 | 7.43 | 0.29 |
| 980 | 2.72 | 0.32 |
| 985 | 1.14 | 0.28 |
| 990 | 0.57 | 0.16 |

TABLE 6A-continued

| Transmittance of Example 4 (%) | | |
|---|---|---|
| Wavelength (nm) | 0 degrees | 30 degrees |
| 995 | 0.34 | 0.08 |
| 1000 | 0.24 | 0.04 |
| 1005 | 0.19 | 0.02 |
| 1010 | 0.18 | 0.02 |
| 1015 | 0.19 | 0.01 |
| 1020 | 0.22 | 0.01 |
| 1025 | 0.22 | 0.01 |
| 1030 | 0.13 | 0.01 |
| 1035 | 0.07 | 0.01 |
| 1040 | 0.04 | 0.01 |
| 1045 | 0.02 | 0.01 |
| 1050 | 0.01 | 0.01 |

Table 6B shows the values of Wt50v, |dWt50v|, Wt50i, |dWt50i|, Wt50avg, RdTv, RdTi, T3540, T4050, T4563, T5060, T6065, T7076, T7080, T70105, T8387, T45, T55, T65, T85 Example 4 at the incidence angles of 0 degrees and 30 degrees.

TABLE 6B

| | 0 degrees | 30 degrees |
|---|---|---|
| Wt50v (nm) | 651.60 | 641.30 |
| |dWt50v| (nm) | | 10.30 |
| Wt50i (nm) | 936.15 | 922.76 |
| |dWt50i| (nm) | | 13.39 |
| Wt50avg (nm) | | 646.45 |
| RdTv | | 0.27 |
| RdTi | | 0.22 |
| T3540 (%) | 0.04 | 0.06 |
| T4050 (%) | 77.20 | 83.67 |
| T4563 (%) | 98.32 | 96.14 |
| T5060 (%) | 99.22 | 98.55 |
| T6065 (%) | 85.70 | 72.07 |
| T7076 (%) | 0.42 | 0.14 |
| T7080 (%) | 0.27 | 10.15 |
| T70105 (%) | 33.25 | 35.06 |
| T8387 (%) | 97.68 | 98.88 |
| T45 (%) | 96.87 | 96.52 |
| T55 (%) | 99.49 | 98.16 |
| T65 (%) | 52.09 | 32.04 |
| T85 (%) | 98.78 | 99.93 |

The multi-layer coating membrane of Example 4 can be disposed on the object-side surface or the image-side surface of the optical element, and a total number of layers of the multi-layer coating membrane tLs=130. The details of each layer of the multi-layer coating membrane of Example 4 are shown in Table 6C.

TABLE 6C

| Layer Sequence | Material | Thickness (nm) |
|---|---|---|
| 1 | H | 9.04 |
| 2 | L | 40.38 |
| 3 | H | 5.35 |
| 4 | L | 29.32 |
| 5 | H | 9.83 |
| 6 | L | 233.26 |
| 7 | H | 6.43 |
| 8 | L | 232.61 |
| 9 | H | 6.28 |
| 10 | L | 213.66 |
| 11 | H | 16.02 |
| 12 | L | 51.35 |
| 13 | H | 7.62 |
| 14 | L | 138.01 |
| 15 | H | 32.40 |
| 16 | L | 3.38 |

TABLE 6C-continued

| Layer Sequence | Material | Thickness (nm) |
|---|---|---|
| 17 | H | 74.54 |
| 18 | L | 32.89 |
| 19 | H | 122.84 |
| 20 | L | 37.06 |
| 21 | H | 107.93 |
| 22 | L | 38.36 |
| 23 | H | 7.89 |
| 24 | L | 47.33 |
| 25 | H | 93.96 |
| 26 | L | 31.44 |
| 27 | H | 7.29 |
| 28 | L | 54.29 |
| 29 | H | 97.85 |
| 30 | L | 8.05 |
| 31 | H | 9.04 |
| 32 | L | 47.73 |
| 33 | H | 114.71 |
| 34 | L | 44.73 |
| 35 | H | 83.53 |
| 36 | L | 1.70 |
| 37 | H | 28.01 |
| 38 | L | 64.38 |
| 39 | H | 18.29 |
| 40 | L | 14.14 |
| 41 | H | 81.72 |
| 42 | L | 182.00 |
| 43 | H | 3.38 |
| 44 | L | 174.54 |
| 45 | H | 103.33 |
| 46 | L | 69.89 |
| 47 | H | 14.74 |
| 48 | L | 37.03 |
| 49 | H | 99.93 |
| 50 | L | 12.05 |
| 51 | H | 129.75 |
| 52 | L | 20.44 |
| 53 | H | 99.11 |
| 54 | L | 2.21 |
| 55 | H | 18.58 |
| 56 | L | 202.80 |
| 57 | H | 24.10 |
| 58 | L | 49.74 |
| 59 | H | 19.79 |
| 60 | L | 251.91 |
| 61 | H | 9.18 |
| 62 | L | 93.05 |
| 63 | H | 6.14 |
| 64 | L | 256.81 |
| 65 | H | 19.19 |
| 66 | L | 14.85 |
| 67 | H | 38.62 |
| 68 | L | 4.74 |
| 69 | H | 35.08 |
| 70 | L | 140.76 |
| 71 | H | 1.11 |
| 72 | L | 38.51 |
| 73 | H | 125.21 |
| 74 | L | 11.91 |
| 75 | H | 228.19 |
| 76 | L | 36.30 |
| 77 | H | 22.14 |
| 78 | L | 46.78 |
| 79 | H | 107.75 |
| 80 | L | 171.62 |
| 81 | H | 117.62 |
| 82 | L | 26.07 |
| 83 | H | 37.28 |
| 84 | L | 14.78 |
| 85 | H | 177.04 |
| 86 | L | 28.29 |
| 87 | H | 27.72 |
| 88 | L | 41.35 |
| 89 | H | 116.33 |
| 90 | L | 118.09 |
| 91 | H | 2.13 |
| 92 | L | 55.89 |
| 93 | H | 117.84 |
| 94 | L | 30.16 |

TABLE 6C-continued

| Layer Sequence | Material | Thickness (nm) |
|---|---|---|
| 95 | H | 16.65 |
| 96 | L | 31.67 |
| 97 | H | 19.80 |
| 98 | L | 28.86 |
| 99 | H | 125.43 |
| 100 | L | 11.92 |
| 101 | H | 15.48 |
| 102 | L | 28.07 |
| 103 | H | 30.36 |
| 104 | L | 27.86 |
| 105 | H | 140.99 |
| 106 | L | 52.06 |
| 107 | H | 13.73 |
| 108 | L | 78.28 |
| 109 | H | 108.82 |
| 110 | L | 111.76 |
| 111 | H | 7.70 |
| 112 | L | 45.83 |
| 113 | H | 151.98 |
| 114 | L | 11.05 |
| 115 | H | 36.50 |
| 116 | L | 19.04 |
| 117 | H | 20.90 |
| 118 | L | 20.13 |
| 119 | H | 110.36 |
| 120 | L | 168.21 |
| 121 | H | 13.38 |
| 122 | L | 2.72 |
| 123 | H | 86.03 |
| 124 | L | 33.71 |
| 125 | H | 11.37 |
| 126 | L | 155.17 |
| 127 | H | 10.79 |
| 128 | L | 38.63 |
| 129 | H | 109.95 |
| 130 | L | 88.04 |

Table 6D shows the values of tTk, LtTk, HtTk, LtTk/HtTk, NH and NL of the multi-layer coating membrane of Example 4.

TABLE 6D

| | | | |
|---|---|---|---|
| tTk (nm) | 8121.72 | LtTk/HtTk | 1.21 |
| LtTk (nm) | 4449.62 | NH | 2.45 |
| HtTk (nm) | 3672.10 | NL | 1.48 |

The total number of layers of the multi-layer coating membrane of Example 4 is 130, which falls within the effective range of 65 layers to 200 layers and is with the dual-bandpass filtering function. Further, a ratio of the total thickness of the low refractive index layer and the total thickness of the high refractive index layer LtTk/HtTk=1.21, which falls within the effective range of 1.0 to 1.5 and has the function of reducing the difference between transmittance at 0 degrees and non-0 degrees of the long-wavelength visible light. Furthermore, the multi-layer coating membrane of Example 4 has a better difference reduction of long-wavelength near-infrared light function compared to that of Example 3.

Example 5

In the optical lens assembly of Example 5, the optical element thereof is an optical lens element, and the optical lens element is made of a plastic material and has aspherical surfaces.

The optical lens assembly of Example 5 includes seven optical lens elements being, in order from an object side to an image side, an optical lens element L1, an optical lens element L2, an optical lens element L3, an optical lens element L4, an optical lens element L5, an optical lens element L6 and an optical lens element L7. At least one optical lens element of the seven optical lens elements includes a multi-layer coating membrane, and the multi-layer coating membrane is formed by alternately stacking high refractive index layers and low refractive index layers. The optical lens assembly of Example 5 can be combined with the multi-layer coating membranes of Example 1 to Example 4 so as to arrange the surfaces of different optical lens elements with different coatings.

Table 7A shows the parameters of the object-side surfaces of the optical lens element L1 to the optical lens element L7 of the optical lens assembly of Example 5, and Table 7B shows the parameters of the image-side surfaces of the optical lens element L1 to the optical lens element L7 of the optical lens assembly of Example 5, wherein SD is a vertical height of the optical lens element at the position of the maximum effective diameter, SD_SAG is a horizontal displacement of the optical lens element at the position of the maximum effective diameter, SPsd is a slope from a center position to a position of the maximum effective diameter of the optical lens element, SAGMAX_SD is a vertical height of the optical lens element at the maximum horizontal displacement position, SAGMAX is a horizontal displacement of the optical lens element at the maximum horizontal displacement position, SPmax is a slope from the center position to the position of the maximum horizontal displacement of the optical lens element, and SPbi is a slope from the position of the maximum horizontal displacement to the position of the maximum effective diameter of the optical lens element. Further, when the multi-layer coating membrane is disposed on a surface with a better flatness, a best uniformity of the membrane can be obtained, and the effective evaluation of the optical lens element in Table 7A and Table 7B will be filled in with "*". Furthermore, "-" represents that the position of the maximum effective diameter is the same as the position of the maximum horizontal displacement of the optical lens element.

TABLE 7A

| Parameters of the object-side surfaces of the optical lens elements of Example 5 | | | | | | | |
|---|---|---|---|---|---|---|---|
| | L1 | L2 | L3 | L4 | L5 | L6 | L7 |
| SD (mm) | 1.28 | 1.17 | 1.13 | 1.64 | 2.04 | 2.85 | 3.72 |
| SD_SAG (mm) | 0.48 | 0.06 | −0.05 | −0.32 | −0.58 | −0.64 | −1.10 |
| \|SPsd\| | 2.69 | 19.25 | 23.42 | 5.07 | 3.51 | 4.45 | 3.39 |
| SAGMAX_SD (mm) | 1.28 | 1.17 | 1.13 | 1.64 | 2.04 | 2.85 | 3.35 |

TABLE 7A-continued

Parameters of the object-side surfaces of the optical lens elements of
Example 5

|  | L1 | L2 | L3 | L4 | L5 | L6 | L7 |
|---|---|---|---|---|---|---|---|
| SAGMAX (mm) | 0.48 | 0.06 | −0.05 | −0.32 | −0.58 | −0.64 | −1.12 |
| \|SPmax\| | 2.69 | 19.25 | 23.42 | 5.07 | 3.51 | 4.45 | 2.98 |
| \|SPbi\| | — | — | — | — | — | — | 15.15 |
| Effective evaluation of the optical lens element | | * | * | | | | |

TABLE 7B

Parameters of the image-side surfaces of the optical lens elements of
Example 5

|  | L1 | L2 | L3 | L4 | L5 | L6 | L7 |
|---|---|---|---|---|---|---|---|
| SD (mm) | 1.24 | 1.07 | 1.34 | 1.82 | 2.44 | 3.10 | 3.92 |
| SD_SAG (mm) | 0.10 | 0.13 | −0.24 | −0.28 | −0.80 | −0.75 | −1.13 |
| \|SPsd\| | 12.28 | 8.23 | 5.56 | 6.43 | 3.05 | 4.13 | 3.48 |
| SAGMAX_SD (mm) | 1.20 | 1.07 | 1.34 | 1.82 | 2.44 | 3.10 | 3.92 |
| SAGMAX (mm) | 0.10 | 0.13 | −0.24 | −0.28 | −0.80 | −0.75 | −1.13 |
| \|SPmax\| | 11.71 | 8.23 | 5.56 | 6.43 | 3.05 | 4.13 | 3.48 |
| \|SPbi\| | 29.16 | — | — | — | — | — | — |
| Effective evaluation of the optical lens element | * | * | | | | | |

In the optical lens assembly of Example 5, the image-side surface of the optical lens element L1, the object-side surface and the image-side surface of the optical lens element L2, and the object-side surface of the optical lens element L3 have a better flatness and are more suitable for use with the multi-layer coating membrane of Example 1 to Example 4, but the present disclosure is not limited thereto.

Example 6

In the optical lens assembly of Example 6, the optical element thereof is an optical lens element, and the optical lens element is made of a plastic material and has aspherical surfaces.

The optical lens assembly of Example 6 includes eight optical lens elements being, in order from an object side to an image side, an optical lens element L1, an optical lens element L2, an optical lens element L3, an optical lens element L4, an optical lens element L5, an optical lens element L6, an optical lens element L7 and an optical lens element L8. At least one optical lens element of the eight optical lens elements includes a multi-layer coating membrane, and the multi-layer coating membrane is formed by alternately stacking high refractive index layers and low refractive index layers. The optical lens assembly of Example 6 can be combined with the multi-layer coating membranes of Example 1 to Example 4 so as to arrange the surfaces of different optical lens elements with different coatings.

Table 8A and Table 8B respectively show the values of SD, SD_SAG, |SPsd|, SAGMAX_SD, SAGMAX, |SPmax| and |SPbi| of the object-side surfaces and the image-side surfaces of the optical lens element L1 to the optical lens element L8 of the optical lens assembly of Example 6. When the multi-layer coating membrane is disposed on a surface with a better flatness, a best uniformity of the membrane can be obtained, and the effective evaluation of the optical lens element in Table 8A and Table 8B will be filled in with "*". Further, "-" represents that the position of the maximum effective diameter is the same as the position of the maximum horizontal displacement of the optical lens element.

TABLE 8A

Parameters of the object-side surfaces of the optical lens elements of
Example 6

|  | L1 | L2 | L3 | L4 | L5 | L6 | L7 | L8 |
|---|---|---|---|---|---|---|---|---|
| SD (mm) | 1.96 | 1.86 | 1.73 | 1.80 | 2.50 | 2.95 | 4.02 | 5.66 |
| SD_SAG (mm) | 0.79 | 0.26 | 0.20 | −0.26 | −0.24 | −1.09 | −1.07 | −1.80 |
| \|SPsd\| | 2.47 | 7.17 | 8.51 | 6.83 | 10.29 | 2.70 | 3.74 | 3.15 |
| SAGMAX_SD (mm) | 1.96 | 1.86 | 1.73 | 1.80 | 2.33 | 2.95 | 4.02 | 5.09 |
| SAGMAX (mm) | 0.79 | 0.26 | 0.20 | −0.26 | −0.25 | −1.09 | −1.07 | −1.83 |

TABLE 8A-continued

| Parameters of the object-side surfaces of the optical lens elements of Example 6 | | | | | | | |
| L1 | L2 | L3 | L4 | L5 | L6 | L7 | L8 |
|---|---|---|---|---|---|---|---|
| |SPmax| | 2.47 | 7.17 | 8.51 | 6.83 | 9.31 | 2.70 | 3.74 | 2.78 |
| |SPbi| | — | — | — | — | 24.31 | — | — | 18.50 |
| Effective evaluation of the optical lens element | | | * | | * | | | |

TABLE 8B

| Parameters of the image-side surfaces of the optical lens elements of Example 6 | | | | | | | |
| L1 | L2 | L3 | L4 | L5 | L6 | L7 | L8 |
|---|---|---|---|---|---|---|---|
| SD (mm) | 1.87 | 1.74 | 1.69 | 2.11 | 2.72 | 3.45 | 4.41 | 5.99 |
| SD_SAG (mm) | 0.29 | 0.35 | 0.04 | −0.28 | −0.37 | −1.25 | −1.27 | −2.12 |
| |SPsd| | 6.45 | 4.92 | 46.80 | 10.29 | 7.43 | 2.76 | 3.47 | 2.82 |
| SAGMAX_SD (mm) | 1.87 | 1.74 | 1.69 | 2.11 | 2.49 | 3.45 | 4.41 | 5.99 |
| SAGMAX (mm) | 0.29 | 0.35 | 0.04 | −0.28 | −0.37 | −1.25 | −1.27 | −2.12 |
| |SPmax| | 6.45 | 4.92 | 46.80 | 9.31 | 6.64 | 2.76 | 3.47 | 2.82 |
| |SPbi| | — | — | — | 24.31 | 25.42 | — | — | — |
| Effective evaluation of the optical lens element | | | * | * | | | | |

In the optical lens assembly of Example 6, the object-side surface and the image-side surface of the optical lens element L3, the image-side surface of the optical lens element L4, and the object-side surface of the optical lens element L5 have a better flatness and are more suitable for use with the multi-layer coating membrane of Example 1 to Example 4, but the present disclosure is not limited thereto.

Example 7

In the optical lens assembly of Example 7, the optical element thereof is an optical lens element, and the optical lens element is made of a plastic material and has aspherical surfaces.

The optical lens assembly of Example 7 includes night optical lens elements being, in order from an object side to an image side, an optical lens element L1, an optical lens element L2, an optical lens element L3, an optical lens element L4, an optical lens element L5, an optical lens element L6, an optical lens element L7, an optical lens element L8 and an optical lens element L9. At least one optical lens element of the night optical lens elements includes a multi-layer coating membrane, and the multi-layer coating membrane is formed by alternately stacking high refractive index layers and low refractive index layers. The optical lens assembly of Example 7 can be combined with the multi-layer coating membranes of Example 1 to Example 4 so as to arrange the surfaces of different optical lens elements with different coatings.

Table 9A and Table 9B respectively show the values of SD, SD_SAG, |SPsd|, SAGMAX_SD, SAGMAX, |SPmax| and |SPbi| of the object-side surfaces and the image-side surfaces of the optical lens element L1 to the optical lens element L9 of the optical lens assembly of Example 7. When the multi-layer coating membrane is disposed on a surface with a better flatness, a best uniformity of the membrane can be obtained, and the effective evaluation of the optical lens element in Table 9A and Table 9B will be filled in with "*". Further, "-" represents that the position of the maximum effective diameter is the same as the position of the maximum horizontal displacement of the optical lens element.

TABLE 9A

| Parameters of the object-side surfaces of the optical lens elements of Example 7 | | | | | | | | |
| L1 | L2 | L3 | L4 | L5 | L6 | L7 | L8 | L9 |
|---|---|---|---|---|---|---|---|---|
| SD (mm) | 3.64 | 3.24 | 3.18 | 3.04 | 2.83 | 2.67 | 2.88 | 2.84 | 3.00 |
| SD_SAG (mm) | 0.45 | −0.64 | 1.01 | 0.44 | 0.03 | 0.06 | −0.03 | −0.49 | −0.25 |
| |SPsd| | 8.05 | 5.09 | 3.16 | 6.88 | 93.26 | 46.97 | 99.99 | 5.74 | 11.94 |
| SAGMAX_SD (mm) | 3.64 | 3.24 | 3.18 | 3.04 | 2.57 | 2.43 | 2.48 | 2.84 | 3.00 |
| SAGMAX (mm) | 0.45 | −0.64 | 1.01 | 0.44 | 0.03 | 0.06 | −0.06 | −0.49 | −0.25 |
| |SPmax| | 8.05 | 5.09 | 3.16 | 6.88 | 78.24 | 38.59 | 39.93 | 5.74 | 11.94 |
| |SPbi| | — | — | — | — | 103.92 | 39.81 | 12.01 | — | — |
| Effective evaluation of the optical lens element | * | | | | * | * | * | | * |

TABLE 9B

| | | Parameters of the image-side surfaces of the optical lens elements of Example 7 | | | | | | | |
|---|---|---|---|---|---|---|---|---|---|
| | L1 | L2 | L3 | L4 | L5 | L6 | L7 | L8 | L9 |
| SD (mm) | 3.40 | 3.01 | 3.06 | 2.91 | 2.66 | 2.75 | 2.85 | 2.85 | 3.43 |
| SD_SAG (mm) | -0.34 | 0.58 | 0.28 | -0.18 | 0.58 | -0.49 | -0.39 | 0.47 | -0.55 |
| \|SPsd\| | 9.89 | 5.22 | 10.78 | 16.56 | 4.60 | 5.62 | 7.26 | 6.04 | 6.27 |
| SAGMAX_SD (mm) | 3.40 | 3.01 | 3.06 | 2.91 | 2.66 | 2.75 | 2.81 | 2.85 | 3.43 |
| SAGMAX (mm) | -0.34 | 0.58 | 0.28 | -0.18 | 0.58 | -0.49 | -0.39 | 0.47 | -0.55 |
| \|SPmax\| | 9.89 | 5.22 | 10.78 | 16.56 | 4.60 | 5.62 | 7.13 | 6.04 | 6.27 |
| \|SPbi\| | — | — | — | — | — | — | 25.38 | — | — |
| Effective evaluation of the optical lens element | * | | * | * | | | | | |

In the optical lens assembly of Example 7, the object-side surface and the image-side surface of the optical lens element L1, the image-side surface of the optical lens element L3, the image-side surface of the optical lens element L4, the object-side surface of the optical lens element L5, the object-side surface of the optical lens element L6, the object-side surface of the optical lens element L7, and the object-side surface of the optical lens element L9 have a better flatness and are more suitable for use with the multi-layer coating membrane of Example 1 to Example 4, but the present disclosure is not limited thereto.

The filtering coating membrane of the present disclosure can be additionally coated on the surfaces of other elements, such as a cover glass, a protective glass, a plastic board, a glass board, a reflective element, etc. The integral filtering effect can be obtained by the filtering coating membrane disposed on the surfaces of other elements so as to complete the insufficient wavelength range. Therefore, the coating membrane disposed on the surfaces of the optical lens elements can be used to filter out the light with specific wavelength range, so that the number of coating layers and the thickness thereof can be reduced. Further, after arranging the optical lens elements with absorbing materials, an integral desired filtering effect can be achieved by combining the respective filtering effects of the multiple elements.

By the arrangement that the cover glass is disposed on the surface of the image sensor (the image surface of the optical lens element) and the optical lens element includes the long-wavelength absorbing material and the infrared filter coating disposed on the surface thereof, the angle of the chief ray in the all fields of maximum image height incident into the image sensor of the optical lens assembly of the present disclosure can be reduced, so that the effects of reducing the back focal length and total length can be achieved. Further, in order to obtain similar or the same refractive indices of the cover glass and the surface of the image sensor, a high molecular polymer can be arranged between the image sensor and the cover glass so as to make the refractive index of the image sensor close to or the same as the refractive index of the cover glass. Therefore, light can pass through the interface between the cover glass and the image sensor directly without being refracted so as to avoid the second refraction which causes the incident angle increasing.

There can be an air layer or without an air layer between the cover glass and the image sensor of the optical lens assembly of the present disclosure. When the optical lens assembly of the present disclosure is designed as an optical system with the air layer between the cover glass and the image sensor, the anti-reflective coating membrane can be manufactured on at least one or both of the object-side surface and the image-side surface of the cover glass. Further, when the optical lens assembly of the present disclosure is designed as an optical system without the air layer between the cover glass and the image sensor, the anti-reflective coating membrane can be manufactured on the object-side surface of the cover glass.

In the optical lens element or the optical element of the optical lens assembly of the present disclosure, the optical element, such as the cover glass, a micro lens, a blue glass, a filter or a color filter, can be penetrated by the visible light. Further, the object-side surface or the image-side surface of the optical element can include the anti-reflective coating membrane. The anti-reflective coating membrane includes at least one coating layer, which can be formed by alternately stacking high refractive index layers and low refractive index layers, formed by subwavelength structures, formed by the combination of the high refractive index layers and the subwavelength structures, formed by the combination of the low refractive index layers and the subwavelength structures, or formed by the combination of the high refractive index layers, the low refractive index layers and the subwavelength structures.

The anti-reflective coating membrane of the optical lens assembly of the present disclosure can include the subwavelength structures disposed thereon (adjacent to the air), and the material thereof can be metal oxide such as aluminum oxide ($Al_2O_3$). The subwavelength structures of the anti-reflective coating membrane include a plurality of holes, and the sizes of the holes adjacent to the outside of the anti-reflective coating membrane are larger than that of the holes adjacent to the inside of the anti-reflective coating membrane. Further, the anti-reflective coating membrane of the optical lens assembly of the present disclosure can include other coating layers on the inside (adjacent to the substrate), such as the high refractive index layers and the low refractive index layers.

The object-side surface or the image-side surface of the optical lens element or the optical element, such as the cover glass, the micro lens, the blue glass or the filtering element, of the optical lens assembly of the present disclosure can include the multi-layer coating membrane. The multi-layer coating membrane includes at least one coating layer, which can be formed by alternately stacking high refractive index layers and low refractive index layers. Further, the coating layer can be a single-bandpass filtering membrane, a dual-bandpass filtering membrane, a multi-bandpass filtering membrane, an infrared filtering coating membrane, a long-wavelength filtering coating membrane, an UV filtering coating membrane, a short-wavelength filtering coating membrane, or the combination thereof.

The optical lens element of the optical lens assembly of the present disclosure can include a long-wavelength absorbing material, and the multi-layer coating membrane can be manufactured on at least one or both of the object-side surface and the image-side surface of the optical lens element.

The transmittance of optical lens element including the long-wavelength absorbing material of the optical lens assembly of the present disclosure at a wavelength of 1050 nm can be less than that at a wavelength of 500 nm, and the optical lens assembly can further include an image sensor disposed on the image surface of the optical lens assembly.

The optical lens element of the optical lens assembly of the present disclosure can include a long-wavelength absorbing material, and the multi-layer coating membrane can be manufactured on at least one or both of the object-side surface and the image-side surface of the optical lens element. Further, a blue glass can be arranged on the object side of the image sensor.

The optical lens element of the optical lens assembly of the present disclosure can include a long-wavelength absorbing material, and the multi-layer coating membrane can be manufactured on at least one or both of the object-side surface and the image-side surface of the optical lens element. Further, a cover glass can be arranged on the object side of the image sensor, and the anti-reflective coating membrane can be manufactured on at least one or both of the object-side surface and the image-side surface of the cover glass.

In the optical lens assembly of the present disclosure, at least one or both of the object-side surface and the image-side surface of the cover glass can include the long-wavelength absorbing material. By the arrangement that the long-wavelength absorbing material is mixed with the high molecular polymer, and the polymer is disposed on the surface of the cover glass, the multi-layer coating membrane can be manufactured on at least one or both of the object-side surface and the image-side surface of the optical lens element. Further, the long-wavelength absorbing material can be arranged among a plurality of the cover glasses, and the surface of the cover glass can be further designed to include the anti-reflective coating membrane. There is an air layer or without air layer between the cover glass and the image sensor. When the optical lens assembly of the present disclosure is designed as an optical system with the air layer between the cover glass and the image sensor, the membrane including the long-wavelength absorbing material can be manufactured on at least one or both of the object-side surface and the image-side surface of the cover glass, and the surface of the cover glass can be further designed to include the anti-reflective coating membrane. Further, when the optical lens assembly of the present disclosure is designed as an optical system without the air layer between the cover glass and the image sensor, the membrane including the long-wavelength absorbing material can be manufactured on the object-side surface of the cover glass, and the surface of the cover glass can be further designed to include the anti-reflective coating membrane.

In the optical lens assembly of the present disclosure, the surface of the micro lens can include the long-wavelength absorbing material. By the arrangement that the long-wavelength absorbing material is mixed with the high molecular polymer, and the polymer is disposed on the surface of the micro lens, the multi-layer coating membrane can be manufactured on at least one or both of the object-side surface and the image-side surface of the optical lens element. Further, the surface of the image sensor can be designed to include the cover glass so as to protect the image sensor effectively.

According to the optical lens assembly of the present disclosure, the long-wavelength absorbing material can be arranged on an object side of the micro lens. The long-wavelength absorbing material is mixed with the high molecular polymer, and the polymer is arranged between the micro lens and the color filter as a connecting layer. Further, the long-wavelength absorbing material can also be mixed and arranged in the color filter, and it can be chosen to arrange the long-wavelength absorbing material in the part of red, green and blue filters, or only in the part of red filter.

The filtering element of the present disclosure is an optical element that can filter out the light with a specific wavelength range, such as a color filter formed a part of the image sensor, an infrared filtering element, the blue glass, a narrow wavelength filtering element, a short wavelength filtering element, a long wavelength filtering element, etc.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly, comprising:
   at least one optical element;
   wherein at least one of the at least one optical element comprises a multi-layer coating membrane, and the multi-layer coating membrane is formed by alternately stacking high refractive index layers and low refractive index layers;
   wherein the multi-layer coating membrane is a dual-bandpass filtering membrane;
   wherein the optical element is an optical lens element, a wavelength difference between an incidence at 0 degrees and an incidence at 30 degrees of the optical element comprising the multi-layer coating membrane at 50% transmittance of long-wavelength visible light is dWt50v, an average transmittance in a wavelength range of 450 nm-630 nm of the optical element comprising the multi-layer coating membrane is T4563, an average transmittance in a wavelength range of 700 nm-760 nm of the optical element comprising the multi-layer coating membrane is T7076, a slope from a center position to a position of a maximum effective diameter of the optical lens element is SPsd, and the following conditions are satisfied:
   $|dWt50v| \leq 20$ nm;
   $70\% \leq T4563$;
   $T7076 \leq 3\%$; and
   $7.5 < |SPsd|$.

2. The optical lens assembly of claim 1, wherein a proportion of a total transmittance difference between the incidence at 0 degrees and the incidence at 30 degrees of the optical element comprising the multi-layer coating membrane in a wavelength range of 600 nm-700 nm of long-wavelength visible light is RdTv, and the following condition is satisfied:

RdTv≤0.45.

3. The optical lens assembly of claim 1, wherein an average wavelength of the incidence at 0 degrees and the incidence at 30 degrees of the optical element comprising the multi-layer coating membrane at 50% transmittance of long-wavelength visible light is Wt50avg, and the following condition is satisfied:

640 nm≤Wt50avg≤670 nm.

4. The optical lens assembly of claim 3, wherein a wavelength difference between an incidence at 0 degrees and an incidence at 30 degrees of the optical element comprising the multi-layer coating membrane at 50% transmittance of long-wavelength near-infrared light is dWt50i, and the following condition is satisfied:

|dWt50i|≤30.

5. The optical lens assembly of claim 4, wherein a proportion of a total transmittance difference between the incidence at 0 degrees and the incidence at 30 degrees of the optical element comprising the multi-layer coating membrane in a wavelength range of 850 nm-1000 nm of long-wavelength near-infrared light is RdTi, and the following condition is satisfied:

RdTi≤0.45.

6. The optical lens assembly of claim 1, wherein a total number of layers of the multi-layer coating membrane is tLs, and the following condition is satisfied:

65≤tLs≤200.

7. The optical lens assembly of claim 6, wherein the multi-layer coating membrane comprises at least one of the low refractive index layers, the multi-layer coating membrane comprises at least one of the high refractive index layers, a total thickness of the low refractive index layer is LtTk, a total thickness of the high refractive index layer is HtTk, and the following condition is satisfied:

1.0≤LtTk/HtTk≤1.5.

8. The optical lens assembly of claim 1, wherein the optical element comprising the multi-layer coating membrane is an optical lens element, and the optical lens element is made of a plastic material and has aspherical surfaces.

9. The optical lens assembly of claim 8, wherein each of an object-side surface and an image-side surface of the at least one optical element comprises the multi-layer coating membrane, a total thickness of the multi-layer coating membrane on the object-side surface of the optical element is otTk, a total thickness of the multi-layer coating membrane on the image-side surface of the optical element is itTk, and the following condition is satisfied:

0.1≤otTk/itTk≤10.

10. The optical lens assembly of claim 9, wherein the multi-layer coating membrane comprises at least one of the low refractive index layers, the multi-layer coating membrane comprises at least one of the high refractive index layers, a refractive index of the high refractive index layer is NH, a refractive index of the low refractive index layer is NL, and the following conditions are satisfied:

1.9≤NH; and

NL<1.9.

11. The optical lens assembly of claim 1, wherein a transmittance at a wavelength of 850 nm of the optical element comprising the multi-layer coating membrane is T85, and the following condition is satisfied:

70%≤T85.

12. The optical lens assembly of claim 11, wherein an average transmittance in a wavelength range of 830 nm-870 nm of the optical element comprising the multi-layer coating membrane is T8387, and the following condition is satisfied:

70%≤T8387.

13. The optical lens assembly of claim 1, wherein the slope from the center position to the position of the maximum effective diameter of the optical lens element is SPsd, and the following condition is satisfied:

7.6≤|SPsd|.

14. The optical lens assembly of claim 13, wherein a slope from the center position to a position of a maximum horizontal displacement of the optical lens element is SPmax, and the following condition is satisfied:

7.5≤|SPmax|.

15. The optical lens assembly of claim 14, wherein when the position of the maximum effective diameter and the position of the maximum horizontal displacement of the optical lens element are different, a slope from the position of the maximum horizontal displacement to the position of the maximum effective diameter of the optical lens element is SPbi, and the following condition is satisfied:

7.5≤|SPbi|.

16. An imaging apparatus, comprising:
the optical lens assembly of claim 1; and
an image sensor disposed on an image surface of the optical lens assembly.

17. An electronic device, comprising:
the imaging apparatus of claim 16.

\* \* \* \* \*